United States Patent [19]

Anderson

[11] Patent Number: 5,825,363
[45] Date of Patent: Oct. 20, 1998

[54] METHOD AND APPARATUS FOR DETERMINING VISIBLE SURFACES

[75] Inventor: Michael D. Anderson, Bellevue, Wash.

[73] Assignee: Microsoft Corporation, Redmond, Wash.

[21] Appl. No.: 653,380

[22] Filed: May 24, 1996

[51] Int. Cl.$^6$ .................................................. G06T 15/40
[52] U.S. Cl. ............................................................ 345/422
[58] Field of Search .................................... 345/421, 422, 345/435

[56] References Cited

U.S. PATENT DOCUMENTS

| | | | |
|---|---|---|---|
| 4,992,780 | 2/1991 | Penna et al. | 345/422 X |
| 5,295,234 | 3/1994 | Ishida et al. | 345/421 |

OTHER PUBLICATIONS

Regan et al., "Priority Rendering with a Virtual Reality Address Recalculation Pipeline", Computer Graphics Proceedings, Annual Conference Series, pp. 166–162, 1994.

James D. Foley, et al., *Computer Graphics*, 1990, section 15.4, "The Z–Buffer Algorithm", pp. 668–672.

Primary Examiner—Mark K. Zimmerman
Attorney, Agent, or Firm—Jones & Askew, LLP

[57] ABSTRACT

A system for rendering a three-dimensional scene by determining each visible surface of geometric shapes for a sequence of frames. For a selected frame, a working frame buffer is initialized by copying background data maintained in a background frame buffer to the working frame buffer. A working Z buffer is initialized by copying background depth data of the background Z buffer to the working Z buffer. The background data is represented by a bitmap defining values for pixels of a background remaining constant for the frame sequence. The background depth data is represented by depth values defining distances between a view point reference and the geometric shapes at the pixels of the selected frame. For a selected geometric shape, a pixel is selected from a set of pixels for the frame. This set of pixels is defined by an intersection between the view point reference and the selected geometric shape. A determination is then made whether the selected geometric shape obscures another geometric shape at the selected pixel. If so, a value of the selected pixel is obtained and stored within the working frame buffer. In addition, a depth value defined by a distance between the view point reference and the selected geometric shape is stored within the working Z buffer. These steps are completed for each remaining pixel within the set of pixels and, in turn, this process is completed for each remaining geometric shape.

27 Claims, 14 Drawing Sheets

| 5 | 5 | 5 | 5 | 5 | 5 | 5 | 5 | 5 |
|---|---|---|---|---|---|---|---|---|
| 5 | 5 | 5 | 5 | 5 | 5 | 5 | 5 | $2^{16}-1$ |
| 5 | 5 | 5 | 5 | 5 | 5 | 5 | $2^{16}-1$ | $2^{16}-1$ |
| 5 | 5 | 5 | 5 | 5 | 5 | $2^{16}-1$ | $2^{16}-1$ | $2^{16}-1$ |
| 5 | 5 | 5 | 5 | 5 | $2^{16}-1$ | $2^{16}-1$ | $2^{16}-1$ | $2^{16}-1$ |
| 5 | 5 | 5 | 5 | $2^{16}-1$ | $2^{16}-1$ | $2^{16}-1$ | $2^{16}-1$ | $2^{16}-1$ |
| 5 | 5 | 5 | $2^{16}-1$ | $2^{16}-1$ | $2^{16}-1$ | $2^{16}-1$ | $2^{16}-1$ | $2^{16}-1$ |
| 5 | 5 | $2^{16}$ | $2^{16}-1$ | $2^{16}-1$ | $2^{16}-1$ | $2^{16}-1$ | $2^{16}-1$ | $2^{16}-1$ |

| 5 | 5 | 5 | 5 | 5 | 5 | 5 | 5 | 5 |
|---|---|---|---|---|---|---|---|---|
| 5 | 5 | 5 | 5 | 5 | 5 | 5 | 5 | $2^{16}-1$ |
| 5 | 5 | 5 | 5 | 5 | 5 | 5 | $2^{16}-1$ | $2^{16}-1$ |
| 5 | 5 | 5 | 5 | 5 | 5 | $2^{16}-1$ | $2^{16}-1$ | $2^{16}-1$ |
| 5 | 5 | 5 | 5 | 5 | $2^{16}-1$ | $2^{16}-1$ | $2^{16}-1$ | $2^{16}-1$ |
| 5 | 5 | 5 | 5 | $2^{16}-1$ | $2^{16}-1$ | $2^{16}-1$ | $2^{16}-1$ | $2^{16}-1$ |
| 5 | 5 | 5 | $2^{16}-1$ | $2^{16}-1$ | $2^{16}-1$ | $2^{16}-1$ | $2^{16}-1$ | $2^{16}-1$ |
| 5 | 5 | $2^{16}-1$ | $2^{16}-1$ | $2^{16}-1$ | $2^{16}-1$ | $2^{16}-1$ | $2^{16}-1$ | $2^{16}-1$ |

| 3 | 5 | 5 | 5 | 5 | 5 | 5 | 5 | 5 |
|---|---|---|---|---|---|---|---|---|
| 4 | 4 | 5 | 5 | 5 | 5 | 5 | 5 | $2^{16}-1$ |
| 5 | 5 | 5 | 5 | 5 | 5 | 5 | $2^{16}-1$ | $2^{16}-1$ |
| 5 | 5 | 5 | 5 | 5 | 5 | $2^{16}-1$ | $2^{16}-1$ | $2^{16}-1$ |
| 5 | 5 | 5 | 5 | 5 | $2^{16}-1$ | $2^{16}-1$ | $2^{16}-1$ | $2^{16}-1$ |
| 5 | 5 | 5 | 5 | 8 | 8 | $2^{16}-1$ | $2^{16}-1$ | $2^{16}-1$ |
| 5 | 5 | 5 | 9 | 9 | 9 | 9 | $2^{16}-1$ | $2^{16}-1$ |
| 5 | 5 | 10 | 10 | 10 | 10 | 10 | 10 | $2^{16}-1$ |

METHOD AND APPARATUS FOR DETERMINING VISIBLE SURFACES

TECHNICAL FIELD

The invention relates generally to scan conversion systems and, more specifically, to a system for minimizing rerendering of geometric shapes, such as polygons, for a sequence of frames.

BACKGROUND OF THE INVENTION

Many general purpose computer systems support a display of graphical images on pixel-oriented output devices. A pixel is a discrete segment of an overall field in which an image can be displayed. Although pixels are typically square or round in shape for most devices, many newer pixel-oriented display devices include rectangular pixels. A pixel is activated or "turned on" when the process that generates the display determines that it is appropriate to activate that portion of the image field. Accordingly, the display surface for a pixel-oriented output device consists of a grid of points, or pixels, each of which can be individually illuminated or "darkened" to display an image. Common pixel-oriented output devices are raster scan cathode ray tube (CRT) displays, liquid crystal display (LCD) displays, dot matrix printers, and laser printing devices.

A bit image is a sequential collection of bits representing an image to be displayed by a pixel-oriented output device. A bitmap is a data structure describing a bit image held in a memory storage device. The bitmap can be represented by a grid-like array of pixels, each bit of the bit image corresponding to a pixel, and each array element containing a pixel center. The pixel centers are connected in either horizontal or vertical directions by straight lines commonly described as scan lines or reference lines. Each scan line contains data reflecting which pixels in a subset of the pixel grid must be illuminated in order to form an image.

For example, when a computer system needs to display a particular image at a display location, it accesses the bitmap for that bit image. The computer system then turns the illumination of pixels near the display location "ON" or "OFF" in accordance with the data stored in the bitmap. The concept of displaying a graphical image extends to a temporary display, such as a CRT display, as well as to a more permanent image creation in the form of a printer.

The concept of binary states for a pixel and a bitmap can be extended to a pixelmap, which is a data buffer for storing color image data. For example, each pixel for a color display can be represented by a value defined by multiple bits corresponding to different colors or color shades. A pixel having a value of 8 bits can represent up to 256 colors, whereas a pixel having a value of 24 bits can represent up to about 16 million colors. Although the term "bitmap" is more properly used to define a black-and-white image, the terms bitmap and pixelmap will be used interchangeably throughout this specification to define an image of multiple colors.

For graphics applications, a typical computer system includes a processing unit coupled to system memory and a video controller via a system bus. The video controller is connected to a pixel-oriented output device, such as a CRT monitor. A portion of the system memory is typically set aside for use as a frame buffer. The system memory also contains one or more program modules, such as application programs and an operating system. At least one program module is capable of conducting scan-conversion procedures to set pixels in a bitmap stored in the frame buffer. To display a graphical image on the CRT monitor, the computer system conducts scan conversion operations to produce a bitmap that can be rendered on the selected display device. The video controller can cycle through the frame buffer, one scan line at a time, typically sixty times per second. Memory reference addresses are generated in synch with the raster scan, and pixel values defined by the bitmap in the frame buffer are used to control the intensity or color of the beam of the CRT monitor. Each pixel can correspond to a pixel value having one or more bits to control intensity and color. Thus, each pixel value is used to control the intensity of the CRT beam.

For a realistic presentation of three-dimensional (3D) objects on a pixel-oriented output device, it is necessary to determine which object surfaces are visible to the viewer at each pixel. This can be generally accomplished by identifying the objects in a scene that are closest to the viewer and therefore visible at each pixel. The Z-buffer or depth-buffer algorithm is a known algorithm for determining the spatial relationships of rendered objects in a 3D viewing environment. Polygons can be rendered in any order, and the resulting image will look proper in the sense that objects which are closest to the viewer obscure objects further from the viewer.

Throughout this specification, the terms "object", "models", "polygons", and "geometric shapes" will be used to describe rendering operations. An "object" represents an item that generally can be manipulated as a unit. An object comprises one or more models, which are defined by a collection of polygons (or other shapes) that share the same material properties, such as color, texture, and reflectivity. For example, for a 3D presentation of an actor, the actor represents an object, whereas the actor's foot can be viewed as a model. Although models typically comprise polygons, i.e., a two-dimensional (2D) shape rendered as a unit by a rendering engine, other shapes can be used to form a model. These other shapes are generally referred to throughout this specification as geometric shapes. Thus, an object can comprise one or more models which, in turn, comprise one or more geometric shapes, such as polygons.

The Z-buffer algorithm uses a frame buffer for storing color values and a Z-buffer for storing depth or z-values corresponding to each pixel. The Z-buffer is initialized to infinity or the maximum depth for viewing, which represents the Z-value at the back clipping plane, and the frame buffer is initialized to the background color. The smallest value that can be stored in the Z-buffer represents the depth of the front clipping plane. Polygons representing the object can be scan-converted into the frame buffer in an arbitrary order. However, the Z-buffer algorithm is more efficient if the polygons are first sorted by depth, so that the front-most polygon is rendered first by the rendering engine. During the scan-conversion process, if the polygon point being scan converted at pixel coordinates (x, y) is closer to the viewer than is the point whose color and depth are currently in the buffers, then the new point's color and depth replace the old values. In this manner, the resulting image will exhibit the proper spatial characteristics because objects closest to the viewer obscure objects further from the viewer.

3D rendering is computationally intensive and, therefore, a time-consuming task for a personal computer system. Current 3D rendering engines, when combined with conventional personal computers, are capable of rendering approximately twenty thousand polygons per second. However, for an animated frame sequence at a typical frame rate, such as 6 frames per second, rendering operations by a conventional 3D rendering engine generally results in the rendering of only about 3,000 polygons per frame. An approximation of a static or non-static object, such as a human or cartoon character, typically can comprise approximately 1,000 polygons. For example, an approximation of a realistic background may comprise hundreds of background objects, which, in turn, each comprise approximately 1,000 polygons.

For a typical 3D sequence of "f" frames in which the view point remains constant, each frame contains a combination of background objects, static objects, and non-static objects. A background comprises a collection of objects called "background objects" because they are known to remain static for a selected view point. Objects that do not move or change for the duration of a frame sequence are known as "static objects". The remaining objects, those that can move or change during a frame sequence, are termed "non-static objects". Conventional rendering engines render objects on a frame-by-frame basis regardless of the object type, thereby resulting in the rerendering of static objects during the frame sequence. This represents an inefficient use of computing resources and can lead to degraded playback performance of an animated sequence of frames.

In view of the foregoing, there is a need for minimizing the rerendering of objects of a frame sequence to achieve an efficient rendering system for animation applications. Moreover, there is a need for a system that efficiently renders a frame sequence having complex background objects, static objects and one or more animated objects. The present invention fulfills the above-described needs by providing an efficient rendering system that renders non-static objects each frame, while taking advantage of pixel and depth values for once-rendered objects that remain static during the frame sequence or for a fixed view point.

SUMMARY OF THE INVENTION

The present invention provides a system for rendering a sequence of frames by relying upon once-rendered data for three-dimensional (3D) objects that remain static during the frame sequence, and rendering only those objects that change from frame to frame. On a frame-by-frame basis, the present invention can efficiently determine each visible surface in a 3D scene having a background and one or more objects projected onto this background. A 3D scene typically comprises multiple frames using the same background and is typically represented by thousands of geometric shapes. The present invention can achieve an efficient playback performance of the frame sequence on a pixel-oriented output device by minimizing rerendering operations. The present invention achieves this advantage by using a combination of a background frame buffer and a background Z buffer to initialize a set of corresponding working buffers on a frame-by-frame basis.

To minimize rerendering operations, four buffers are maintained in memory for use during rendering and drawing operations by the computer system. The four buffers include (1) a background frame buffer; (2) a background Z buffer, also described as a background depth buffer, (3) a working frame buffer; and (4) a working Z buffer, also described as a working depth buffer. The background buffers contain information that does not change during a frame sequence for a fixed view point reference, whereas the working buffers are useful for adding information that is rendered at each frame. Entries in the Z buffers correspond to the pixel values in the frame buffers.

Specifically, the background frame buffer stores values for pixels of the background objects. The background Z buffer stores depth values defining distances between the view point reference and the geometric shapes the pixels of the background. A background, which is also commonly described as a camera view, is typically pre-rendered and stored within a memory storage device, such as a hard disk or CD-ROM. Backgrounds are typically rendered in advance of run-time, and stored as a combination of background frame and Z buffers. This allows the creation and presentation of complex and elaborate backgrounds comprising many thousands of geometric shapes. Because background objects can be pre-rendered, they are often constructed from thousands of polygons with sophisticated lighting, textures, and dithering techniques. Background objects remain fixed for a selected view point, while static objects remain fixed for a duration of the frame sequence. However, static objects can also be viewed as a portion of a background once these static objects have been rendered.

The working frame buffer stores values for pixels of the frame to be rendered. The working Z buffer stores depth values defining distances between the view point reference and geometric shapes at pixels of the frame to be rendered. For rendering operations, new viewing data, comprising geometric shapes is supplied to the working buffers on a frame-by-frame basis. Each geometric shape is examined, one at a time, to determine the spatial relationship between the geometric shape at a selected pixel and another geometric shape represented by corresponding value stored in the working Z buffer. Each spatial relationship is evaluated based on a view point reference that represents a viewer's direction of view, which is typically positioned in front of the background.

Each frame of the frame sequence is associated with a unique value of a frame number. Prior to the start of rendering operations, a frame number variable is initialized, typically by setting the frame number variable to a known initial value, such as "1". The value of the frame number variable determines which frame is "selected" from the frame sequence for rendering operations. For example, if the frame number variable is set to an initial value, the first frame of the frame sequence is selected for rendering operations. If the frame number variable is set to a value that is greater than the number of frames for the frame sequence, then rendering operations for the frame sequence are completed.

For a selected frame of a frame sequence, the working frame buffer and the working Z buffers are initialized to start a rendering operation. The working frame buffer is initialized by copying background data from the background frame buffer to the working frame buffer. The working Z buffer is initialized by copying background depth data of the background Z buffer to the working Z buffer. The background data is represented by a bitmap defining values for pixels of the background. The background depth data is represented by depth values defining distances between a view point reference and the geometric shapes of the background at pixels corresponding to the background. For the rendering of subsequent frames, this initialization operation can be optimized by the use of a "dirty region" cleaning technique.

During scan conversion operations, new view data, also called working data, is supplied to the working frame and Z buffers. The working data represents geometric shapes to be added during a frame. For a selected geometric shape of the working data, a pixel is selected from a particular set of pixels. The location of this set of pixels is defined by the intersection of the selected geometric shape and the view point reference. A determination is made whether the selected geometric shape obscures another geometric shape. This determination can be conducted by comparing the depth of the selected geometric shape with the depth stored in the Z-buffer at the selected pixel.

If the selected geometric shape obscures each previously rendered geometric shape at the selected pixel, a value for this selected pixel is obtained and stored within the working frame buffer. This pixel value defines the color for that pixel. A color look-up table can be accessed during a subsequent drawing to designate the particular color associated with that pixel value. A depth value, which is defined by a distance between the view point reference and the selected geometric shape, is also stored within the working Z buffer.

The above-described rendering steps are completed for each remaining pixel for the set of pixels associated with the selected geometric shape and, in turn, this rendering process is completed for each remaining geometric shape. After rendering the selected frame, the contents of the working frame buffer can be copied to the pixel-oriented output device to paint the image defined by these pixel values.

For the frame sequence, an inquiry now can be conducted to determine whether remaining frames are available for rendering operations, i.e., is another frame in the sequence available for rendering. If so, working frame and Z buffers are cleaned by an initialization operation, and another frame in the frame sequence is selected for rendering. This initialization operation can be completed by the use of a "dirty region" technique, which identifies the updated values of the working buffers and forms a union of these dirty regions, which can be represented by rectangles that cover corresponding dirty regions. In turn, values of the background buffers corresponding to this union of dirty regions can be copied to the working buffers, thereby initializing these buffers for the next rendering operation. Rendering operations can be completed for each remaining frame in this manner.

It will be appreciated that static objects, once rendered, correspond to pixel values and depth values that remain constant for the sequence of frames in which these objects remain fixed. In addition, background objects remain constant for the fixed view point reference during the frame sequence. Consequently, rendering operations can be optimized by (1) adding the once-rendered information for these static objects to the background information within the background buffers, and (2) initializing the working buffers with information copied from the edited versions of the background buffers. Advantageously, this technique minimizes rerendering of such static objects for a frame sequence.

In view of the foregoing, an object of the present invention is to provide a system for efficiently determining on a frame-by-frame basis each visible surface of a scene having a background and one or more objects projected onto this background.

It is a further object of the present invention to provide an efficient rendering system that renders non-static objects into each frame, while taking advantage of rendered objects that remain static during the frame sequence to minimize re-rendering operations.

A further object of the present invention is to provide a system for minimizing rerendering operations to achieve an efficient use of computing resources and to maximize drawing performance for a frame sequence.

That the present invention achieves these objects and fulfills the needs described hereinabove will be appreciated from the detailed description to follow and the appended drawings.

DETAILED DESCRIPTION

Figure 1:
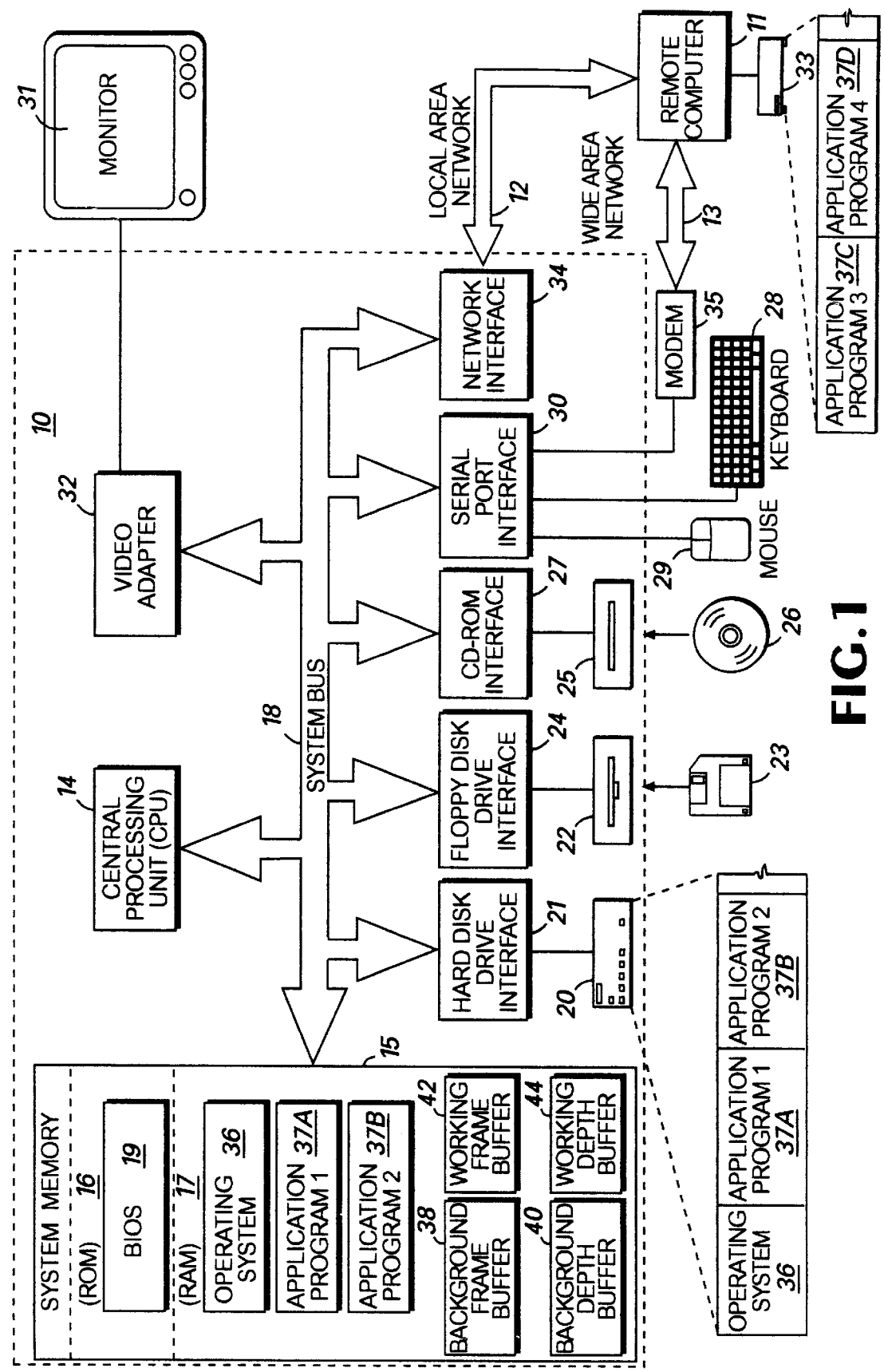
FIG. 1 is a high-level block diagram of a computer system in which the preferred embodiment of the present invention is operative.

The present invention is directed to an efficient system for rendering a sequence of frames by relying upon once-rendered data for objects that remain static during the frame sequence, and rendering only those objects that change from frame to frame. The present invention achieves this advantage by using a combination of a background frame buffer and a background Z buffer to initialize a set of corresponding working buffers on a frame-by-frame basis. Once-rendered information, including pixel values and depth values, are transferred from the background buffers to the working buffers prior to a determination of spatial relationships. The rendering engine then examines the geometric shapes of each object to be rendered for a frame to determine whether a geometric shape of the examined object obscures a previously rendered geometric shape at a particular pixel. If so, the working buffers are updated with pixel and depth values for the geometric shape of this examined object.

A scene comprising multiple frames typically includes background objects, static objects, and non-static objects. Background objects are known to remain static for a selected view point reference. For the preferred embodiment, background objects are rendered prior to run-time, thereby supporting the playback of a complex background for a frame sequence. Static objects, which remain fixed for the frame sequence, are identified at runtime, i.e., prior to rendering a frame sequence, and are rendered once by the rendering engine. In contrast, non-static objects, which can change during the frame sequence, are rendered "on the fly" for each frame of the frame sequence. This effectively reduces the number of rendering operations conducted by the rendering engine, thereby supporting the efficient use of computing resources and achieving a time savings for rendering multiple frames.

The preferred embodiment of the present invention is represented by "3D MOVIE MAKER", which is a computer-implemented animation program marketed by Microsoft Corporation of Redmond, Wash. Briefly described, the program is a tool that allows users to create their own animated three-dimensional (3D) movie for presentation on a computer monitor using a variety of animated actors and scenes. The user can select a background and one or more actors to appear in the background. The background can comprise a collection of background objects, each remaining fixed for the "camera view" or view point. Each actor can be a static object or a non-static object during a frame sequence based on user decisions. Each actor is then placed and oriented in the 3D scene using only the 2D inputs from a mouse (or keyboard). The user can record the movie and cause the actor to move along an arbitrary path and perform any of a variety of actions, such as walking, crawling, and changing costumes. Once recorded, the frame sequence of the animated movie can be presented for viewing on a pixel-oriented output device.

Although the preferred embodiment will be generally described in the context of the above-described application program and an operating system running on a personal computer, those skilled in the art will recognize that the present invention also can be implemented in conjunction with other program modules and other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet. Accordingly, it will be understood that the terms computer, operating system, and application program generally include all types of computers and the program modules designed for them.

The detailed description which follows is represented largely in terms of processes and symbolic representations of operations by conventional computer components, including a processing unit, local memory storage devices connected display devices, and input devices. Furthermore, these processes and operations may utilize conventional computer components in a heterogeneous distributed computing environment, including remote file servers, computer servers, and memory storage devices. Each of these conventional distributed computing components is typically accessible to the local processing unit by a communication network.

The processes and operations performed by the computer include the manipulation of electrical signals by a local processing unit or remote server and the maintenance of these signals within data structures resident in one or more of the local or remote memory storage devices. Such data structures impose a physical organization upon the collection of information, such as data bits, stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require manipulations of physical quantities. Usually, though not necessarily, these quantities take the form of electrical, magnetic, or optical signals capable of being stored, transferred, combined, compared, copied, or otherwise manipulated. It is conventional for those skilled in the art to refer to these signals as bits, bytes, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

In addition, it should be understood that the programs, processes, and methods described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, the present invention and the preferred operating environment will be described.

The Computing Environment

Figure 2:
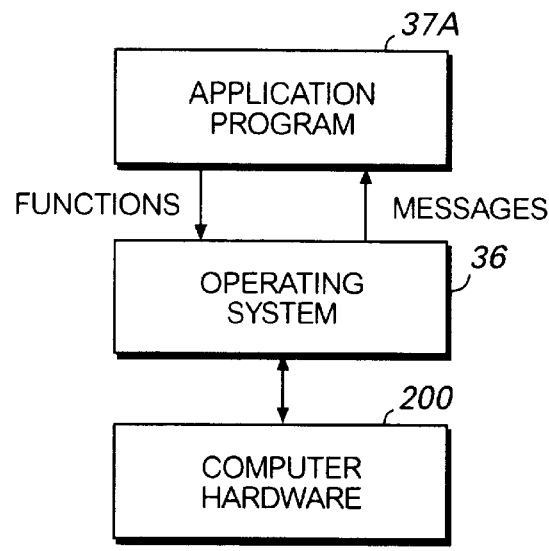
FIG. 2 is a simplified block diagram illustrating the interaction between a computer system, an operating system, and an application program.

FIGS. 1 and 2 illustrate various aspects of the preferred computing environment in which the present invention is designed to operate. Those skilled in the art will immediately appreciate that FIGS. 1 and 2 and the associated discussion are intended to provide a brief, general description of the preferred computer hardware and program modules, and that additional information is readily available in appropriate programming manuals, user's guides, and similar publications.

FIG. 1 illustrates a conventional computer 10 that may suitable for implementing the present invention. As shown in FIG. 1, the computer 10 is operated in a networked environment with logical connections to a remote computer 11. The logical connections between the computer 10 and the remote computer 11 are represented by a local area network 12 and a wide area network 13. Those of ordinary skill in the art will recognize that the remote computer 11 may function as a file server or compute server in this client/server configuration.

The computer 10 includes a processing unit 14, such as the 80486 or "PENTIUM" microprocessors manufactured by Intel Corporation of Santa Clara, Calif. It will be understood that the computer 10 can include other processor models, such as a member of the MIPS family by Silicon Graphics, Inc. or a PowerPC processor by Motorola Corporation. The computer 10 also includes system memory 15 (including read only memory (ROM) 16 and random access memory (RAM) 17), which is connected to the processing unit by the system bus 18. A basic input/output system (BIOS) 19 for the preferred computer 10 is stored in ROM 16. Those skilled in the art will recognize that the BIOS 19 is a set of basic routines that helps to transfer information between elements within the computer 10.

Within the computer 10, a local hard disk drive 20 is connected to the system bus 18 via the hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the computer 10 by using a keyboard 28 and/or a pointing device, such as a mouse 29, which are connected to the system bus 18 via a serial port interface 30. Other types of pointing devices (not shown in FIG. 1) include track pads, track balls, head-tracker, pen, data glove, and other devices suitable for positioning a cursor on a video monitor 31. The video monitor 31 is connected to the system bus 18 via a video adapter 32.

The video monitor 31 represents the preferred pixel-oriented output device for use with the present invention. However, the present invention is not limited to use with conventional video monitor devices, but extends to other types of pixel-oriented devices. It is well known to those skilled in the art that pixel-oriented display devices can include both active light-generating devices, such as CRT displays, and light-absorbing or blocking devices, such as back-lit LCD displays, dot matrix printers, and laser printing devices. These pixel-oriented display devices will be collectively described as display devices or output devices in this specification.

The remote computer 11 in this networked environment is connected to a remote memory storage device 33. This remote memory storage device 33 is typically a large capacity device, such as a hard disk drive, CD-ROM drive, magneto-optical drive or the like. The computer 10 is connected to the remote computer 11 by a network interface 34, which is used to communicate over the local area network 12.

As shown in FIG. 1, the computer 10 is also connected to the remote computer 11 by a modem 35, which is used to communicate over the wide area network 13, such as the Internet. The modem 35 is connected to the system bus 18 via the serial port interface 30. Although illustrated in FIG. 1 as external to the computer 10, those of ordinary skill in the art will quickly recognize that a modem 35 may also be internal to the remote computer 11, thus communicating directly via the system bus 18. It is important to note that connection to the remote computer 11 via both the local area network 12 and the wide area network 13 is not required, but merely illustrates alternative methods of providing a communication path between the computer 10 and the remote computer 11.

Although many other internal components of the computer 10 are not shown, those of ordinary skill in the art will appreciate that such computer components and the interconnection between them are well known. Accordingly, additional details concerning the internal construction of the computer 10 need not be disclosed in connection with the present invention.

Those skilled in the art will understand that program modules, such as an operating system 36, application programs 37, and data are provided to the computer 10 via one of the local or remote memory storage devices, which may include the local hard disk drive 20, floppy disk 23, CD-ROM 26, RAM 17, ROM 16, and the remote memory storage device 33. In the preferred computer 10, the local hard disk drive 20 is used to store data and programs, including the operating system and application programs.

For the preferred embodiment, the system memory also contains a set of buffers that support rendering operations conducted by a computer graphics program module, such as Microsoft's "3D MOVIE MAKER" program. These buffers include a background frame buffer 38, a background depth buffer 40, a working frame buffer 42, and a working depth buffer 44. Typically, a program module executed by the computer 10 can create the buffers 38, 40, 42, and 44 as required to support the presentation of graphical images on the video monitor 31. Although the buffers 38, 40, 42, and 44 are shown to reside in the system memory 15, it will be appreciated that these buffers can also reside on a remote storage device connected to the computer 10, such as the remote memory storage device 33. The buffers 38, 40, 42, and 44 will be described in more detail below with respect to FIGS. 5A–H.

FIG. 2 is a simplified block diagram illustrating the interaction between the computer hardware 200, the operating system 36, and an application program 37a. Referring now to both FIGS. 1 and 2, when the computer 10 is turned on or reset, the BIOS 19, which is stored in the ROM 16, instructs the processing unit 14 to load the operating system 36 from the hard disk drive 20 into the RAM 17. Once the operating system 36 is loaded into RAM 17, the processing unit 14 executes the operating system 36 and typically causes the visual elements associated with the user interface of the operating system 36 to be displayed on the monitor 31.

The operating system 36, in conjunction with the BIOS 19 and associated device drivers, provides the basic interface between the computer's resources, the user, and the application program 37a. The operating system 36 interprets and carries out instructions issued by the user. For example, when the user wants to load an application program 37a, the operating system 36 interprets the instruction (e.g., double clicking on the application program's icon) and causes the processing unit 14 to load the program code into RAM 17 from either the local hard disk drive 20, floppy disk 23, CD-ROM 26, or the remote memory storage device 33. Once the application program 37a is loaded into the RAM 17, it is executed by the processing unit 14. In case of large programs, the processing unit 14 loads various portions of program into RAM 17 as needed.

As discussed earlier, the preferred embodiment of the present invention is embodied in the "3-D MOVIE MAKER" application program, which is designed to operate in conjunction with Microsoft Corporation's "WINDOWS 95" or "WINDOWS NT" operating systems. However, it should be understood that the present invention can readily be implemented by other operating systems, such as Microsoft Corporation's "WINDOWS 3.1" operating system, IBM Corporation's "OS/2" operating system, and the operating system used in "MACINTOSH" computers manufactured by Apple Computer, Inc.

The operating system 36 provides a variety of functions or services that allow an application program 37a to easily deal with various types of input/output (I/O) operations. This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message or by executing the requested task.

The Animation Environment

Although the present invention is directed to an efficient system for rendering 3D graphical scenes comprising multiple frames, i.e., an animation sequence, it is useful to review the preferred animation environment of the present invention, which is embodied by the "3D MOVIE MAKER" application program. The preferred 3D environment for presenting an animated scene will be described in the context of the "3D MOVIE MAKER" program operating on a conventional computer, such as the computer 10.

For the preferred embodiment, a scene comprises a frame sequence having the same background and one or more static or non-static objects. Thus, a scene is presented on a pixel-oriented output device to a viewer as a series of frames or a frame sequence. A background is typically a complex 3D representation that provides a stage for a presentation of various objects, such as actors, projected onto this background. A background, which is typically constructed from multiple thousands of polygons, is preferably rendered prior to run-time and stored on a memory storage device having sufficient storage capacity. An object is a 3D representation of an item manipulated as a unit and may be modeled as having a number of related sub-parts or models. In the preferred embodiment, a representative class of such objects is a 3D humanoid actor with multiple body parts. Each object can comprise one or more models, which, in turn, comprise one ore more geometric shapes, such as polygons.

While a background object is considered to be fixed basis during a selected view point, other objects can be fixed or animated for a sequence of frames. An object is static if it does not change or move for a frame sequence. In contrast, an object is animated or non-static if it moves or changes during frames of a frame sequence. Once rendered, a static object can be treated as a portion of a pre-rendered background, as will described in more detail below with respect to FIGS. 6–8.

In the preferred program, a user is able to easily create a 3D animated movie having a sequence of frames with 3D backgrounds and actors. Initially, the user selects a background from a group of available pre-rendered backgrounds to set the stage for the movie. The user then selects one or more objects, such as an actor, from a group of objects and places and orients each object in the background. The user can record a movie while causing the actor to move along an arbitrary path and to perform any of a variety of actions, such as walking, crawling, and changing costumes. Once each action is recorded, the user may replay or edit the movie.

Figure 3A:
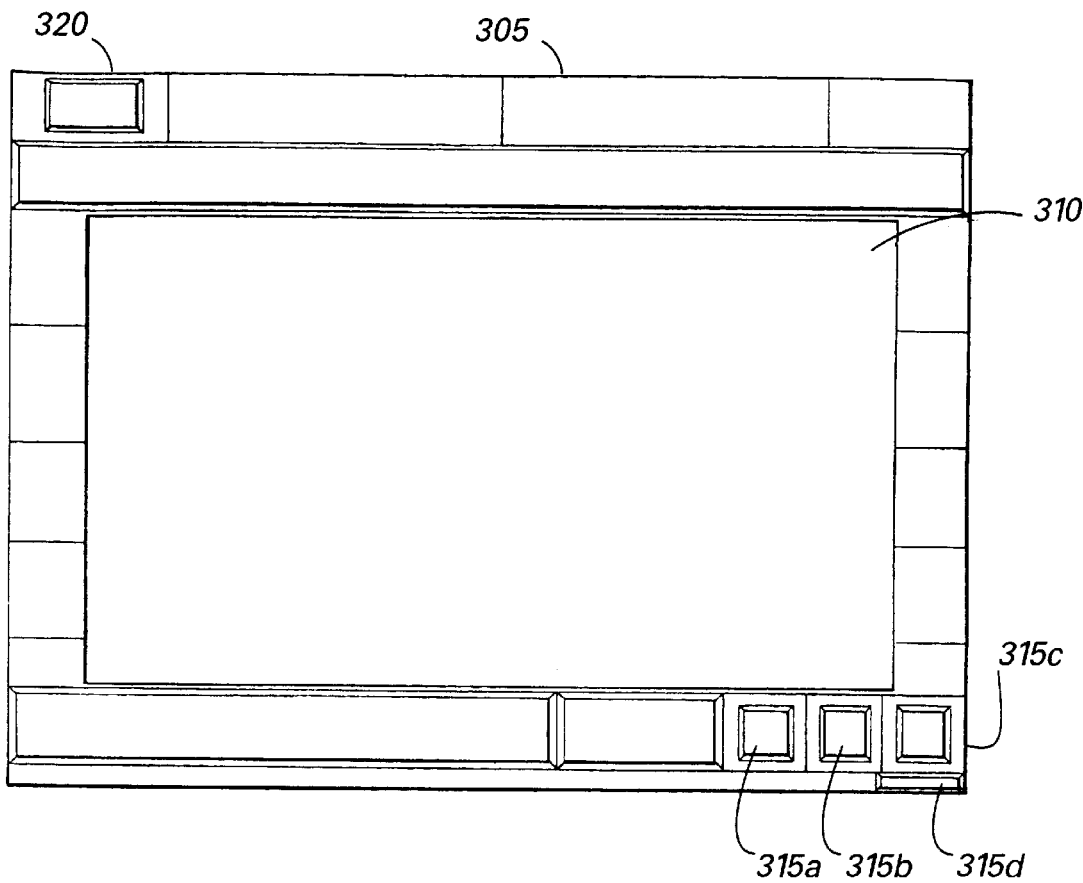
FIGS. 3A–3D, collectively described as FIG. 3, are illustrations of screen displays presented on a pixel-oriented output device to support a user's selection of a 3D background and an object in accordance with the preferred environment of the present invention.

FIGS. 3A–D illustrate the screen displays presented by the preferred program to support the user's selection of a 3D background and actor. Turning now to FIG. 3A, an initial movie creation screen 305 includes a background display area 310 and a series of general operational choice buttons 315a–d. The movie creation screen 305 is displayed on a pixel-oriented output device, such as the video monitor 31 (FIG. 1), after the user indicates that he or she wishes to create a new movie. The movie creation screen 305 provides a "File" button 315a that may be used to save a movie to or to load a movie from one of the computer's memory storage devices. A "Help" button 315b activates a display of textual information to assist the user. A "Map" button 315c assists the user with other available dialog windows in the preferred application. An "Exit" button 315d allows the user to exit from the preferred application.

a. Background Selection

The first step in the creation of a movie is to select a 3D background, which provides a 3D environment or stage for an actor. The user accomplishes this using the mouse to select the "Background Choice" button 320 on the movie creation screen 305.

Figure 3B:
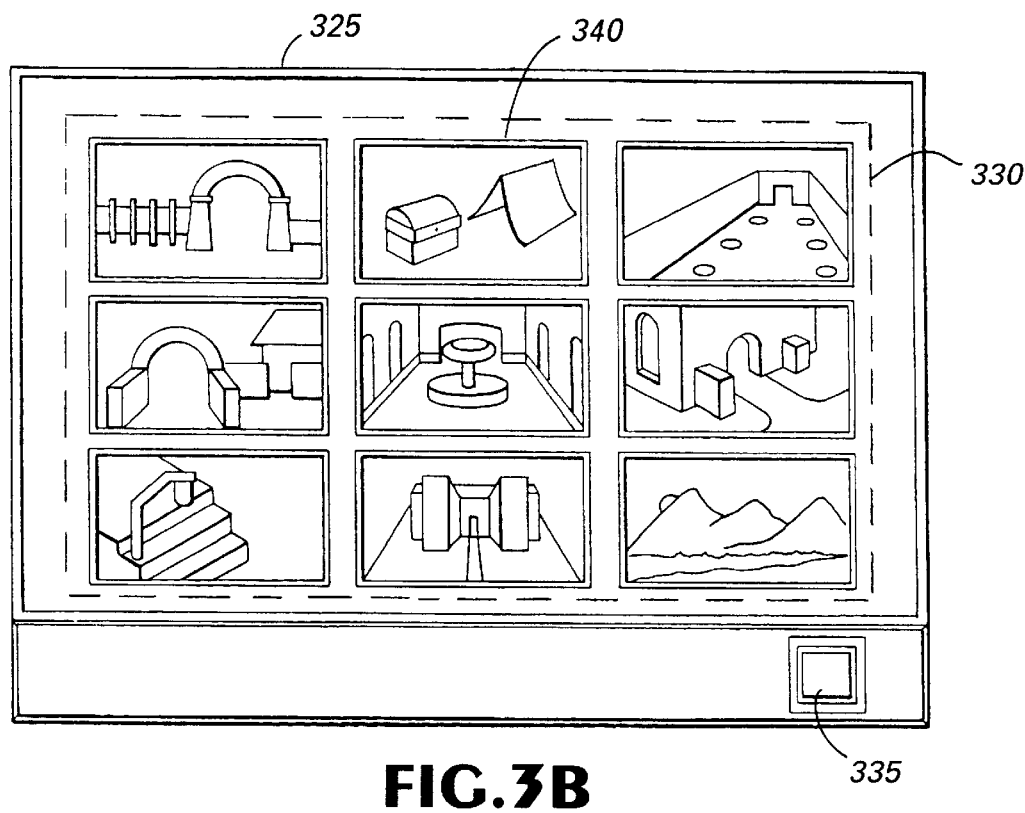

Turning to FIG. 3B, a background browser 325, is displayed by the preferred program in response to the user's selection of the "Background Choice" button 320. The background browser 325 displays a variety of available backgrounds 330 from which the user may choose. The user selects one of the available complex, pre-rendered backgrounds 330 by moving the mouse 29 (FIG. 1) over the desired background 340 and clicking the mouse button. If the user decides not to select one of the available backgrounds 330, the "Cancel" button 335 may be selected at any time.

Figure 3C:
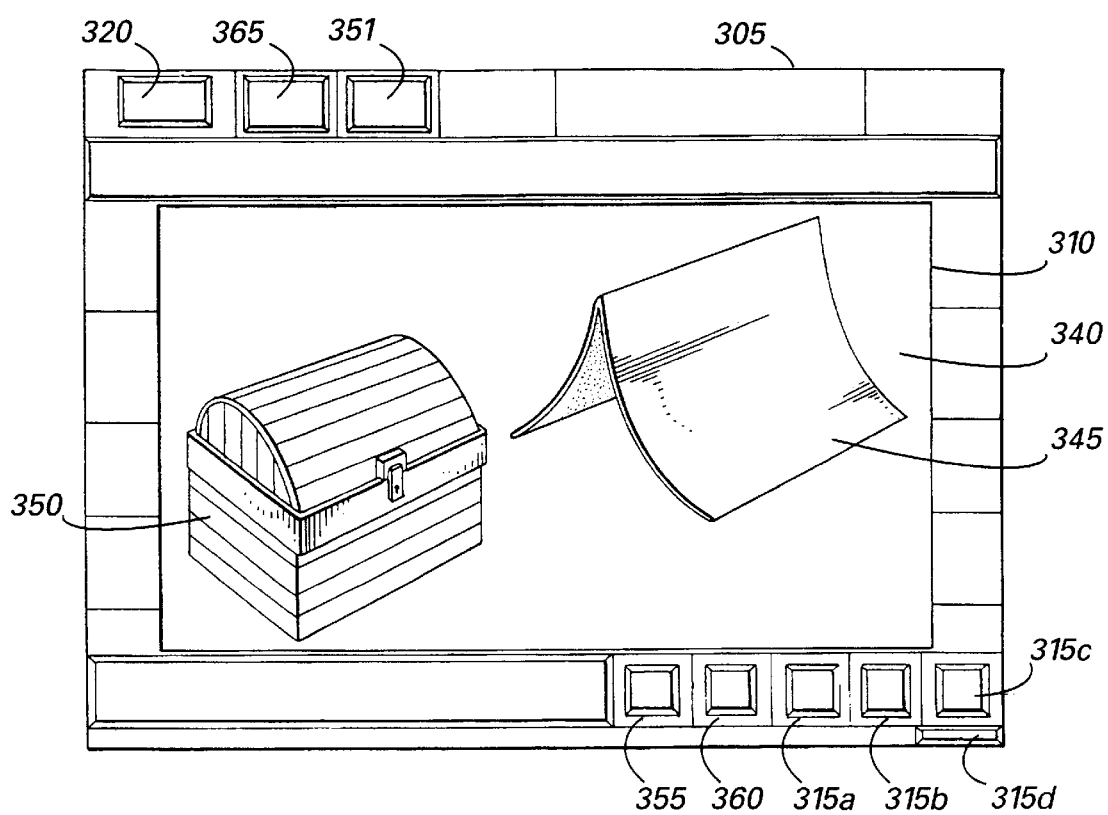

Referring now to FIG. 3C, once a background is selected, the preferred program displays the movie creation screen 305 with the selected background 340 appearing in the background display area 310. The background 340 is drawn on the monitor 31 (FIG. 1) as a 3D perspective rendering and may include several props, such as a tent 345 and a treasure chest 350. The user may place additional props in the desired background 340 by selecting the "Props" button 351.

At this point, several additional buttons also appear in the movie creation screen 305. The "Undo" button 355 allows the user to undo the last step taken. The "Edit" button 360 allows a user to edit the actions associated with the selected background 340.

b. Actor Selection

Figure 3D:
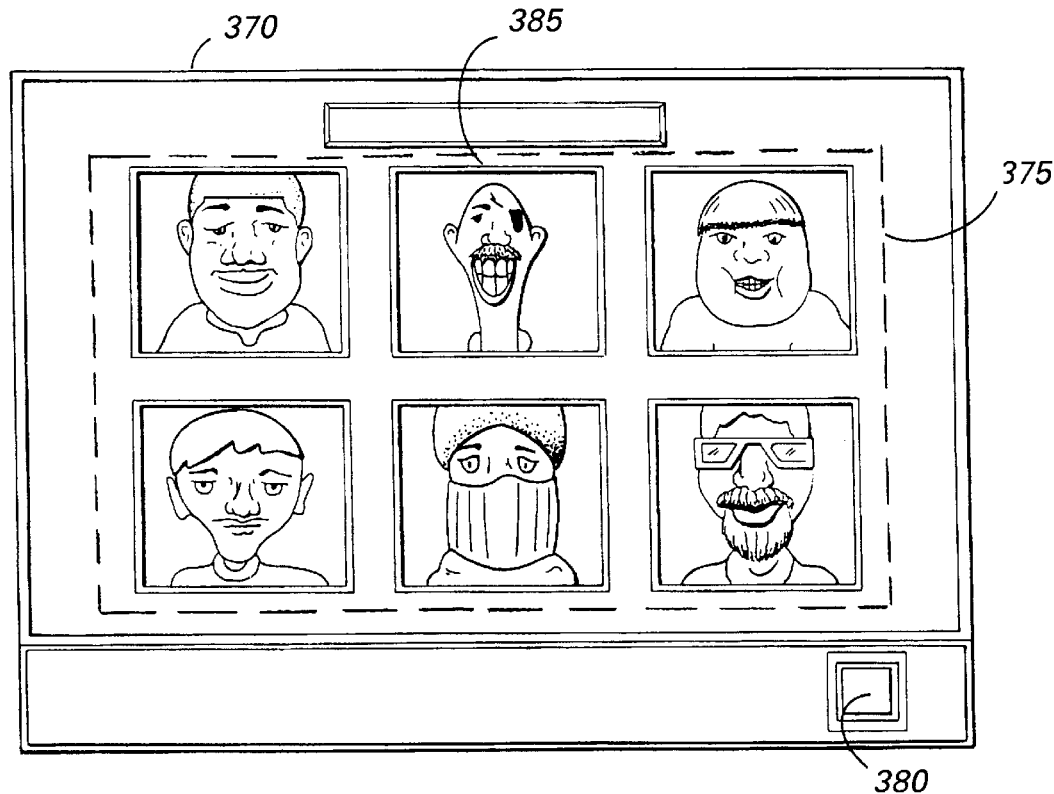

Once a background 340 selected, the user chooses an actor. The "Actor Choice" button 365 allows the user to select an actor to appear in the movie. FIG. 3D illustrates an actor browser 370, which is displayed by the preferred program in response to the user selected the "Actor Choice" button 365. Referring to FIG. 3D, the actor browser 370 displays a variety of available actors 375 that can be used in an animated 3D movie. The user selects one of the available actors 375 by moving the mouse 29 (FIG. 1) over the desired actor 385 and clicking on that actor 385. If the user does not wish to select one of the available actors 375, a "Cancel" button 380 may be selected at any time.

c. Placement and Orientation of an Actor

FIGS. 4A–E depict screen displays associated with placing and orienting an actor 385 in a background 340. In FIGS. 4A–E, the actor is moved along a curved path toward the front left side of the screen. It is important to note that while the actor 385 is moving during the placing and orienting of the actor 385, the preferred program does not record any movement or action of the actor 385 during this process of placing and orienting. This allows the user to move the actor to a desired position for the beginning of the background.

Figure 4A:
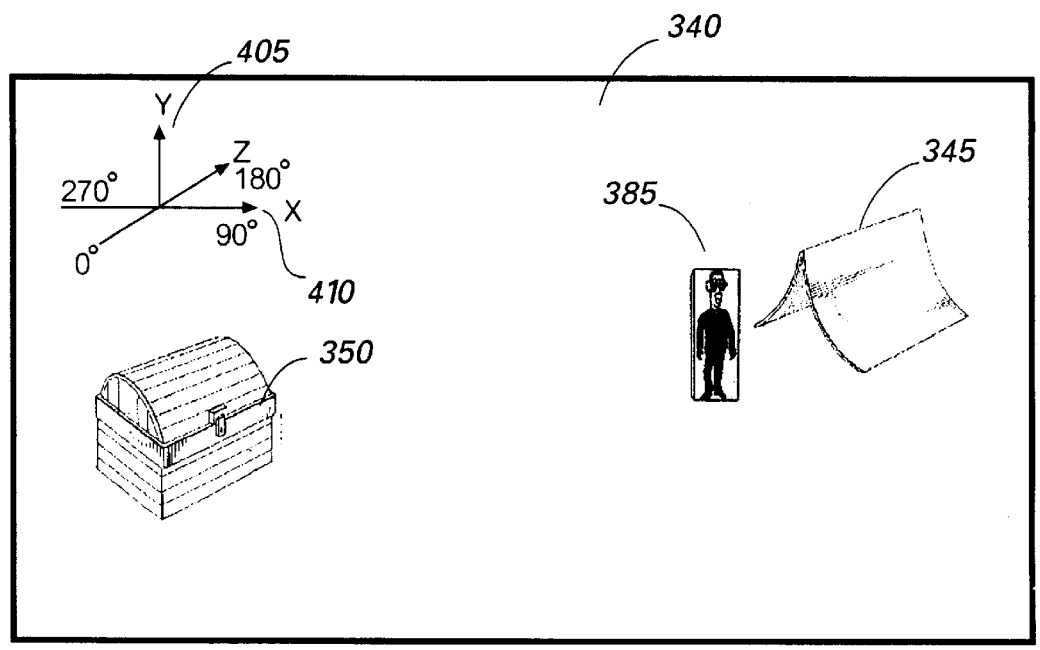
FIGS. 4A–4E, collectively described as FIG. 4, are illustrations of screen displays presented on a pixel-oriented output device and showing placement and orientation of an object on a background in accordance with the preferred environment of the present invention.

After the user selects an actor from the actor browser, the preferred program displays the actor at an initial position in the previously selected background. As illustrated in FIG. 4A, the initial position is in the approximate center of the background with the actor facing the user. The user may then move the actor to another position and reorient the actor prior to beginning to record the movie.

In general, a background 340 allows movement in three dimensions while an input device such as a mouse provides only two-dimensional (2D) input. Therefore, to place the actor 385 within the background 340, one of the three background dimensions is held constant while the two dimensions of mouse movement correspond to the other two dimensions of the background 340. In the preferred program, the vertical position of the actor is held constant (at ground level) while the actor 385 is initially placed and oriented in the background 340. However, the user may move the actor 385 vertically by using the up and down arrow keys on the keyboard 28 (FIG. 1).

The orientation of an actor 385 is established using 2D mouse movements over time. Orientation refers to which absolute angular direction in a horizontal plane the actor 385 is facing. In the preferred application, the orientation of the actor 385 is related to changes in the distance of mouse movement and changes in the angle of mouse movement. Thus, a user is able to simultaneously place and orient the actor 385 in the three-dimensions of the background 340 using only the 2D input from the mouse 29 (FIG. 1).

In FIG. 4A, a background 340 is shown with two elements—a tent 345 and a treasure chest 350. A 3D coordinate legend 405 and an orientation direction reference 410 are shown merely as references and are not visible to the user on the monitor 31 (FIG. 1).

The actor 385 is shown after being selected from the actor browser 370 and is initially located towards the center of the background 340. In this initial position, the actor 385 has an orientation facing in the 0 degree absolute orientation direction (facing toward the user).

Figure 4B:
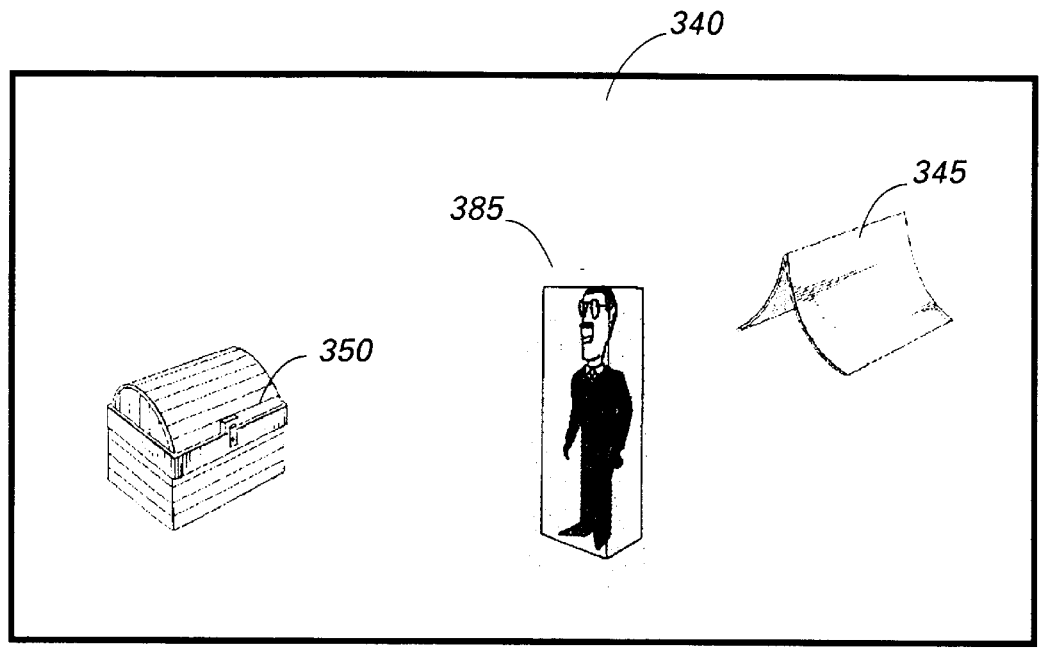

FIG. 4B illustrates the actor 385 at a second point along a curved path toward the front left side of the display. The user has moved the mouse 29 (FIG. 1) a relatively large distance with a small but distinct angular change. Thus, as is readily observable from a comparison of FIG. 4A and FIG. 4B, the actor 385 has been moved closer to the user in this second position with a change in orientation.

Figure 4C:
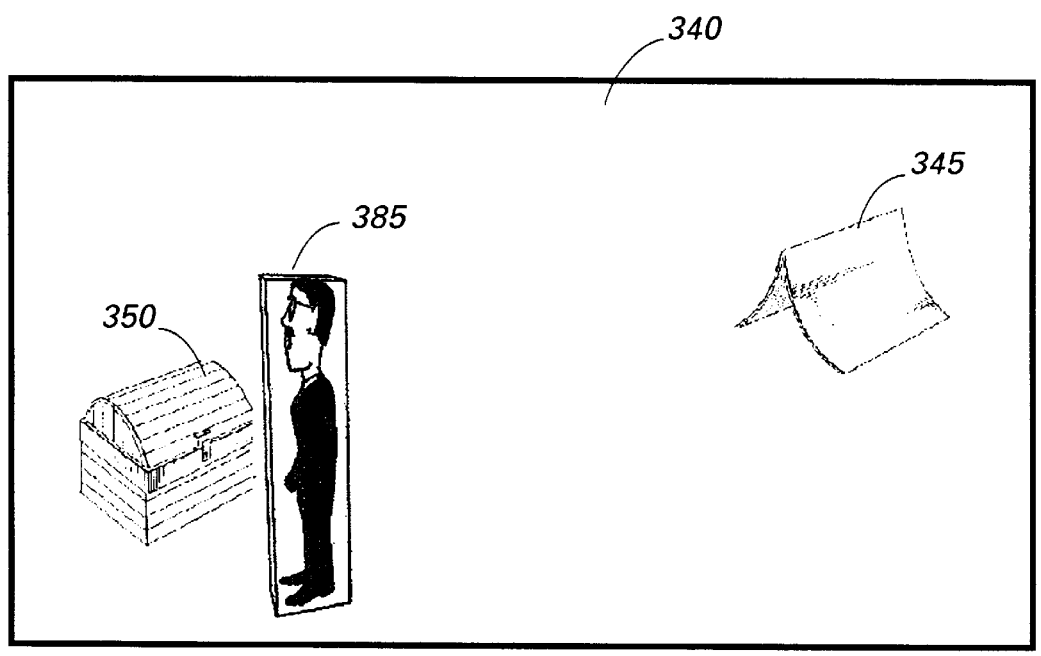

FIG. 4C illustrates the actor 385 at the desired position toward the front left side of the display. Again, the user has moved the mouse 29 (FIG. 1) a relatively large distance with a small but distinct angular change. As a result, as is readily observable from a comparison of FIG. 4B and FIG. 4C, the actor 385 has been further moved to the user's left and the orientation of the actor 385 is changed so that the actor 385 is facing almost directly to the user's left.

Figure 4D:
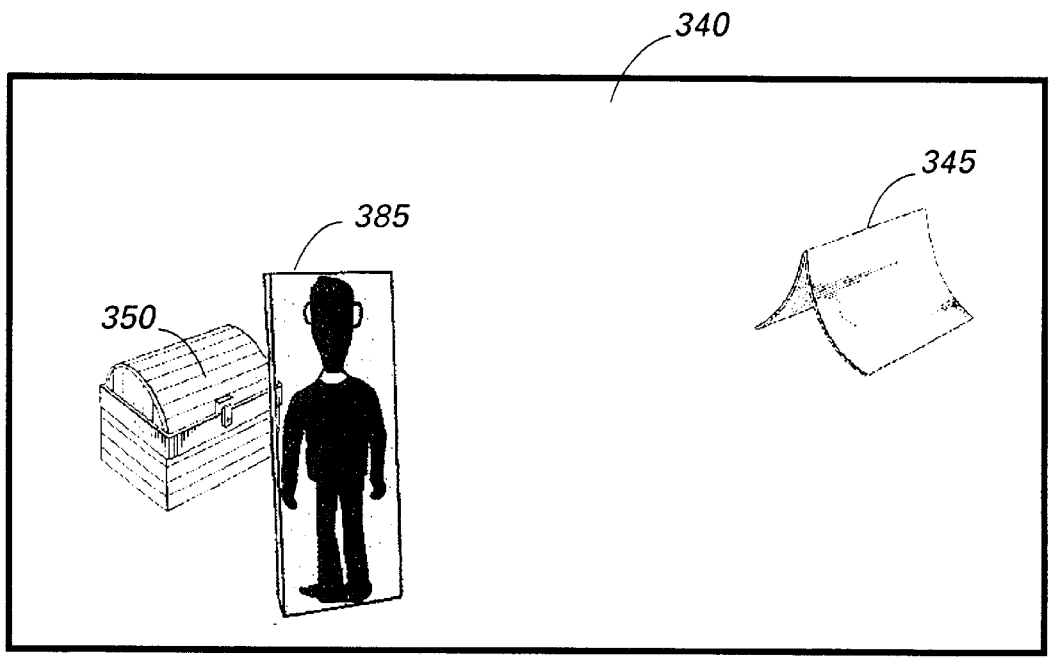
Figure 4E:
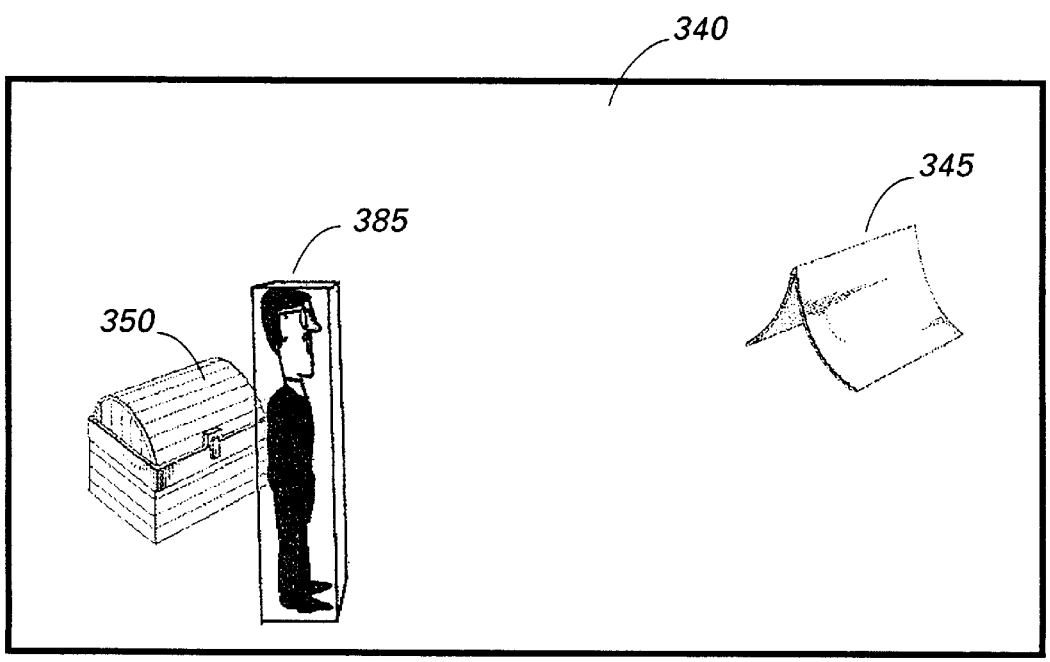

Once the actor is in the desired position, the user may rotate the actor to a desired orientation. FIG. 4D illustrates the actor 385 being rotated clockwise. In this position, the shoulder and arm of the actor obscure a portion of the trunk, thereby supplying a view of the spatial relationship between the actor and the trunk. In this position, the actor is placed closer to the viewer, and the trunk is positioned behind the actor. In FIG. 4E, the actor has finally been rotated so that he is facing the right side of the display.

In summary, the actor 385 has been moved by the user during this placement and orientation process from the center portion of the background 340, towards the left of the background 340, then oriented to face the right of the background 340. After the user is satisfied with the position and orientation of the actor 385, the user "places" the actor 385 by clicking the button on the mouse 29 (FIG. 1).

d. Recording Path and Actions of An Actor

Once the actor 385 is placed and oriented in the background 340, the content of the movie is recorded. This content includes movement of the actor 385 and actions performed by the actor 385. To record the content of the movie, the user selects a path along which the actor 385 travels by selecting the actor 385, selecting an action and dragging the mouse 29 (FIG. 1) along the desired path. The actions performed by the actor 385 at specific locations along the path include such actions as walking, running, crawling, or flying. Thus, the preferred program can record the content of the movie by recording and storing the 3D location of the path and actions performed by the actor 385 while traveling along the path.

In view of the foregoing, it will be understood that a user can select a background comprising numerous background objects. However, the user does not have the option of manipulating any of the background objects of the selected background. In addition, the user can add one or more actors to a scene, including props and 3D words. Also, the user can record motion, costume changes, rotations, and size changes for any of the actors, props, and 3D words. The actors, props, and 3D words can be represented by static or non-static objects, wherein the static objects remain fixed during a frame sequence. Specifically, objects that are not changed by the user for a frame sequence are considered to be "static" objects. In contrast, objects changed by the user during the frame sequence represent "nonstatic" objects. The state of an object is determined when a movie of multiple frames is played back to the user.

Rendering of 3D Objects

FIGS. 5A–5H, collectively described as FIG. 5, illustrate a sequence of information stored within the grids of the background and working buffers during a rendering operation conducted by the preferred embodiment of the present invention. For purposes of illustration in FIG. 5, a pixel's color or value is shown by its shading, whereas a depth value is shown by a numerical value.

Because pixel-oriented output devices are generally limited to two dimensions, it is necessary to transform 3D objects onto a 2D projection plane. Objects in a 3D world are typically clipped against a canonical view volume and are then projected onto a projection plane. The projection plane, also called a view plane, is defined by a point on the plane called the view point reference and a normal to the plane called the view-plane normal. View volume, which is defined by is a front clipping plane and a back clipping plane, is finite volume that bounds that portion of the world which is to be "clipped-out" and projected onto the projection plane. The clipping planes, which are parallel to the projection plane, are specified by a front distance and a back distance relative to the view point reference and along the view-plane normal. This provides a viewer with a good sense of the spatial relationships between different parts of the object as objects appear and disappear from view. Thus, prior to rendering each 3D polygon, it is necessary to transform the 3D data to 2D device coordinates for eventual display by the pixel-oriented output device. This transformation process, which results in information input to the rendering process, is known to those skilled in the art of computer graphics, and will not be further described within this specification.

Figures 5A, 5B:
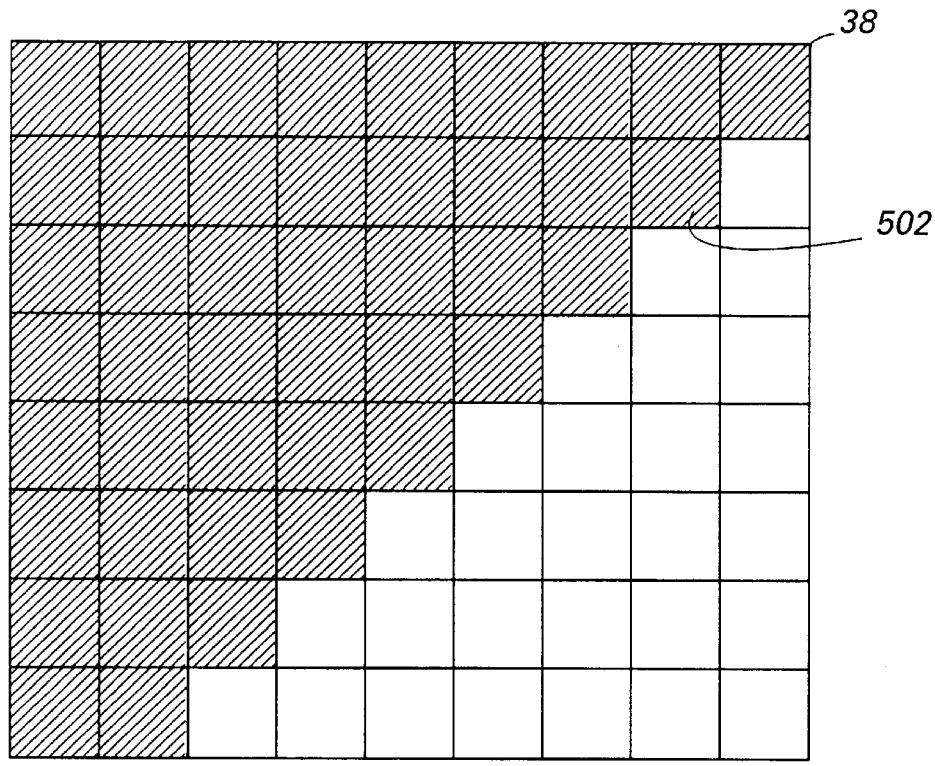
FIGS. 5A–5H, collectively described as FIG. 5, are illustrations of representative data maintained in background frame and depth buffers and working frame and depth buffers for the preferred embodiment of the present invention.

FIGS. 5A and 5B respectively show information stored within a background frame buffer and a background Z buffer. Turning now to FIGS. 1 and 5A and 5B, background buffers 38 and 40 contain information that remains static on a frame-by-frame basis. In contrast, the corresponding working buffers 42 and 44 are useful for adding information that is rendered at each frame. The background frame buffer 38, also known as a background RGB buffer, contains an initial set of "pre-rendered" background data useful for initializing the working frame buffer 42. Likewise, the background Z buffer 40 contains an initial set of numerical data, corresponding to the background data, for initializing the working Z buffer 44. Both sets of data can be supplied to the buffers 42 and 44 via a memory storage device accessible by the computer 10, such as the local hard disk 20 or the remote hard disk 33.

A bitmap stored in the background frame buffer 38 contains pixel values corresponding to the pixels representing the graphical image of the background. As shown in FIG. 5A, the bitmap defines a background polygon 502 having identical pixel values for the pixels corresponding to the image of this polygon. Specifically, an image of the background polygon 502 is represented by pixels having the same relatively light shading. The remaining pixels of the bitmap, which have a cleared state, are represented by the white or non-shaded areas of the bitmap in FIG. 5A.

The background Z-values, or depth values, define the depth information about the background, and correspond to the pixel values contained in the background frame buffer 38. The background depth values are typically generated as a by-product of the process for creating a bitmap for the background. Background data can be obtained by rendering the background objects, i.e., assigning depth values, rather than by hand-drawn techniques or photography because these alternative techniques fail to generate spatial information for storage in the background Z buffer 40. As shown in FIG. 5B, numerical values correspond to depth values for the image of the background polygon 502 shown in FIG. 5A. Each depth value for the background polygon 502 has a numerical value of "5", which represents a distance between the view point and the background polygon at that pixel. The remaining values in the data structure of the background depth buffer 40 are set to a numerical value representing the maximum distance between the view point reference and the scene, as designated by the empty elements of the buffer. Typically, the maximum depth value is considered to be represented by "infinity", which can be viewed as the largest unsigned value of memory, such as $2_{16}$-1 (65,535) for a 16-bit wide memory value. The numerical values of "5" suggest that the background polygon 502 is placed closer to a view point reference than the remaining portion of the background.

It will appreciated that the background depth buffer 40 (and the working depth buffer 44) are typically implemented by 16-bit or 32-bit buffers for the computer 10 (FIG. 1). However, the present invention is not limited to these buffer implementations, and can be extended to smaller or larger buffer sizes.

For the preferred rendering system, a background (comprising background objects having numerous geometric shapes) does not change on a frame-by-frame basis, but rather remains constant for a set of frames during a fixed view point reference. The view point reference preferably remains fixed for the frame sequence to support implementation of this incremental rendering process for static objects. Also, certain objects may remain fixed in place during a sequence of frames. Thus, a static object, once rendered, can be viewed as part of a constant background for a frame sequence. Advantageously, this supports an efficient drawing operation by minimizing the rerendering of the background and the static objects.

Figures 5C, 5D:
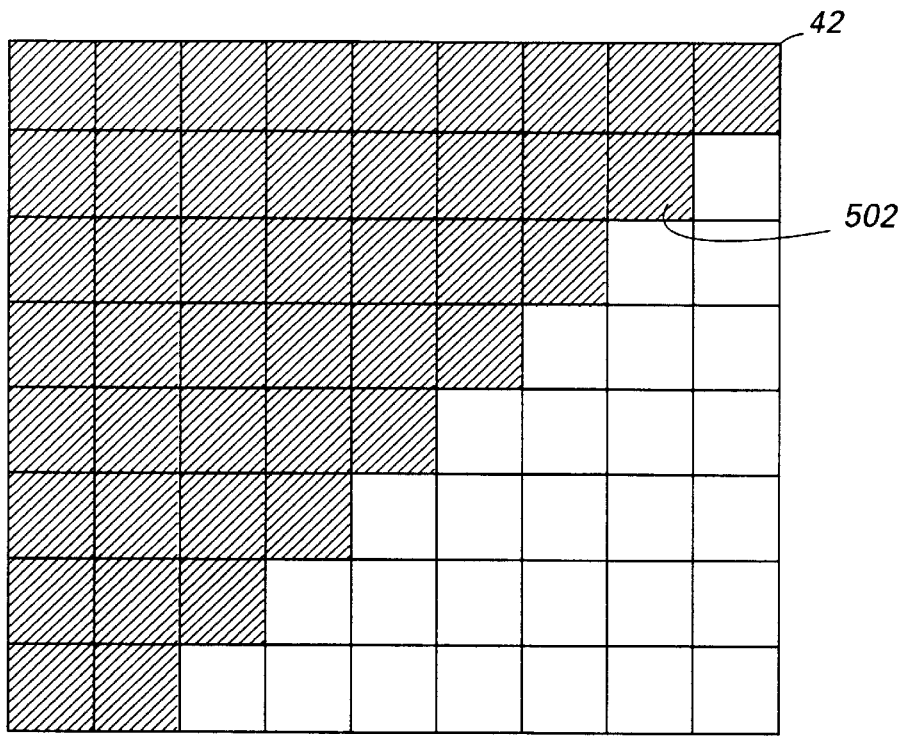

To accomplish the desired goal of minimizing rerendering, the working frame buffer 42 and the working Z buffer 44 are respectively initialized with actual background pixel values and depth values to start the rendering operation. Rather than initializing the working frame buffer 42 with a default solid background color, a bitmap containing pixel values corresponding to pixels for a background can be copied from the background frame buffer 38 into the working frame buffer 42. The working frame buffer 42 is generally operative to store values for pixels of the geometric shapes, typically polygons, to be rendered for each frame. For the "initialized" state, which is shown in FIG. 5C, the working frame buffer 42 includes pixel values identical to those in the bitmap of the background frame buffer 38. Consequently, the background frame buffer 38 in FIG. 5A and the working frame buffer 42 in FIG. 5C share identical pixel values for the initial frame of a frame sequence.

The working Z buffer 44 is generally operative to store depth values defining distances between the view point reference and pixels of the scene to be rendered for each frame. The conventional Z-buffer algorithm dictates an initialization task of loading the working Z buffer 44 with default values representing the maximum distance from a view point reference. In contrast, the rendering operation completed by the preferred embodiment copies depth values corresponding to distances between the background geometric shapes and the view point reference from the background Z buffer 40 to the working Z buffer 44. This "initialized" state of the working Z buffer 44, which is shown in FIG. 5D, includes depth values identical to those in the data structure of the background Z buffer 40. Thus, in contrast to the known Z-buffer algorithm, the working Z buffer 44 is initialized with actual depth values rather than a set of null values. By initializing the working Z buffer 44 with actual depth values for the background, the geometric shapes for objects positioned further from the view point reference than geometric shapes of the background will be obscured by the background.

Figure 5E:
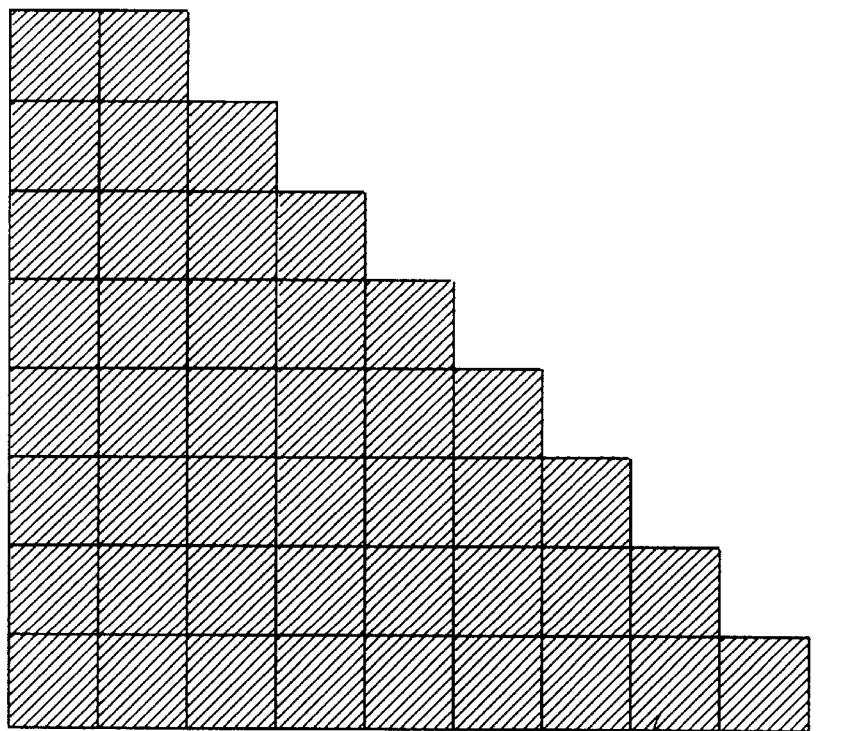
Figure 5F:
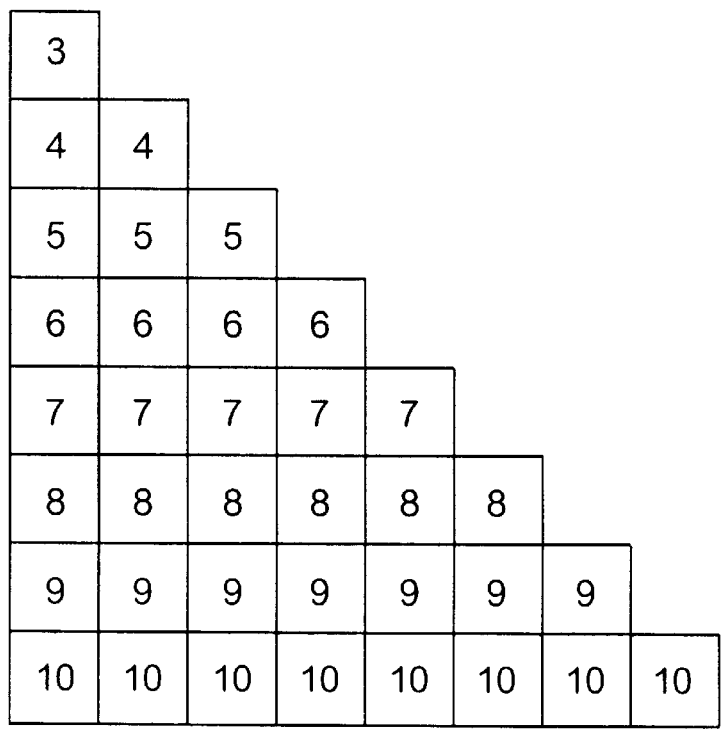

During scan conversion operations, the working data representing information to be added for a frame is supplied to the working frame and Z buffers 42 and 44. This supports the introduction of new viewing data on a frame-by-frame basis. FIGS. 5E and 5F respectively show pixel values and depth values for representative new viewing data useful for updating the information stored in the working buffers 42 and 44. A polygon 504 of constant dark shading is shown in FIG. 5E, as evidenced by the pixels having this dark coloring. Thus, the bitmap defining the polygon 504 contains identical pixel values for the pixels corresponding to the image of this polygon. However, this polygon has a range of different depth values, as evidenced by the numerical values presented in FIG. 5F. These depth values extend between the numerical values of "3" and "10". Thus, some portions of the polygon 504 shown in FIG. 5F are closer to the view point reference than others. For example, on FIG. 5F, a portion of the polygon 504 located at the bottom left-hand corner of the working Z buffer 44 has a depth value of "10". Consequently, this portion of the polygon 504 is further away from the view point reference than that portion of the polygon 504 located at the top left-hand corner of the working Z buffer 44 and having a depth value of "3".

To introduce new frame information to the working buffers 42 and 44, it may be necessary to adjust the pixel values and depth values stored within these buffers to accurately describe the intersection of the existing background data and the new information. As will be described in more detail below with respect to FIGS. 6–7, for each geometric shape of the objects of a frame sequence, a determination can be made whether a selected geometric shape obscures another geometric shape at a selected pixel. This determination is generally conducted by comparing the depth value of the selected geometric shape with the depth value stored in the working Z buffer 44 at the selected pixel. If the geometric shape obscures the geometric shape at the selected pixel, a value of the selected pixel is obtained and stored within the working frame buffer 42. In addition, a depth value defined by a distance between the view point reference and the selected geometric shape is stored within the working Z buffer 44.

Figures 5G, 5H:
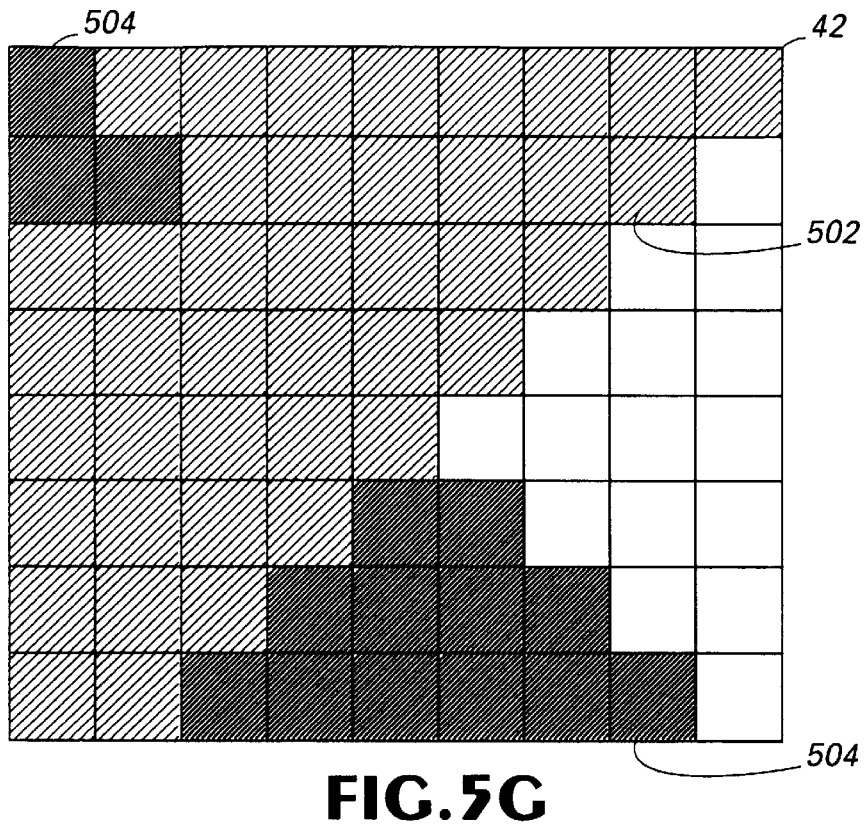

Focusing on FIG. 5H, this comparison of depth values results in an updated version of the stored contents of the working Z buffer 44. This merger of the background data with new viewing data results in the storage of depth values representing the spatial relationship between the two intersecting polygons 502 and 504. Specifically, depth values presently stored within the working Z buffer are compared to the depth values associated with the new viewing data. For this example, this comparison of depth value pairs results in the storage of the depth value having the lower numerical value. The portion of the polygon associated with this lower numerical value is visible to the viewer, thereby obscuring the portion of the remaining "intersecting" polygon having higher numerical values. A visible surface of the polygon 502, located at the bottom left-hand corner and extending to the right hand-side of the buffer, is illustrated by depth values having a constant numeric value of "5". The visible surfaces of the polygon 504, which are located at the top left hand corner and at the bottom right hand corner, are respectively represented by depth values ranging between "3" and "4" and the depth values "8", "9", and "10". The other elements of the working Z buffer 44 remain set to a maximum depth value, for example, $2^{16}-1$, as a result of the above-described comparison of depth values.

As shown in FIG. 5G, the updated version of the working frame buffer 42 contains pixel values for the visible surfaces of two intersecting polygons, the polygon 502 (light shading) and the polygon 504 (dark shading). Because the pixel values in the working frame buffer 42 correspond to the depth values in the working Z buffer, certain portions of the polygons 502 and 504 are hidden from view. The remaining pixel values for the updated working frame buffer are cleared and contain null pixel values, which represent non-illuminated pixels.

Figure 6:
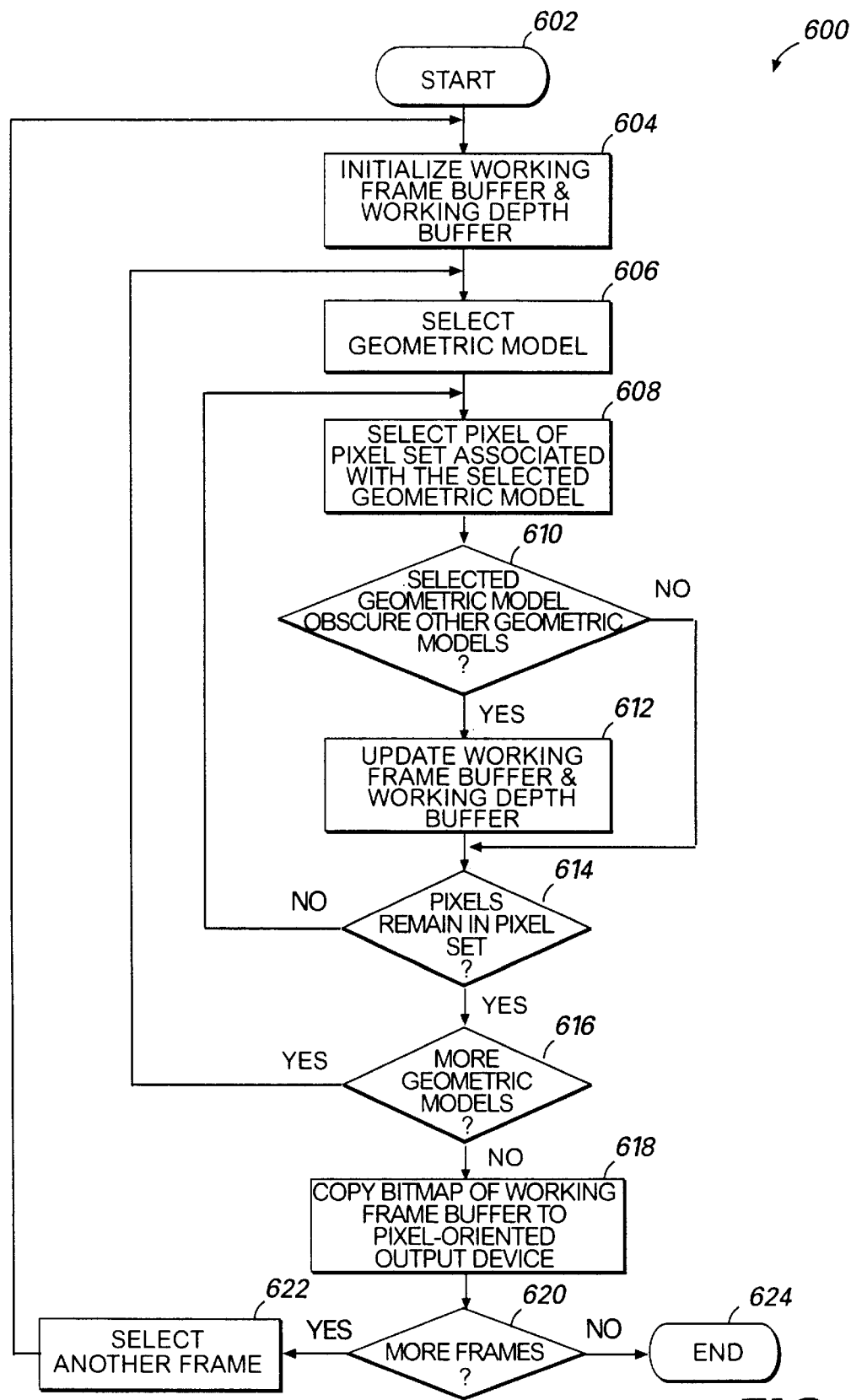
FIG. 6 is a logical flow diagram that generally illustrates the principal steps of a computer-implemented rendering process in accordance with the present invention.

FIG. 6 is a logical flow diagram generally illustrating the steps for determining visible surfaces to support a display on a pixel-oriented output device of an image for a scene comprising a sequence of frames. Prior to this rendering operation, it will be understood that the 3D data is transformed to 2D device coordinates for eventual display by the pixel-oriented output device. For example, a normalizing transformation is applied to scene data. In turn, the transferred data is clipped against a canonical view volume and thereafter project onto a projection plane. This operation results in a transformation of the scene data into 2D device coordinates. The transformation results are supplied as inputs to the rendering process. Thus, the foregoing description of the rendering process assumes that properly transformed scene data is supplied as required to the buffers 38, 40, 42, and 44 during rendering operations.

Turning now to FIGS. 1 and 6, the rendering process 600 begins at the START step 602 for a selected frame of a sequence of "n" frames. The frame can be "selected" based on its assigned frame number and the corresponding value assigned to a frame number variable. For the preferred embodiment, the frame number variable is initially set to a value of "1" at the start of rendering operations. In turn, the contents of the working frame buffer 42 and the working Z buffer 44 of the computer 10 are initialized in step 604. The working frame buffer 42 is initialized by copying background data from the background frame buffer 38 to the working frame buffer 42. This transfers to the working frame buffer 44 a bitmap defining values for pixels of a background that remains static for a known sequence of frames. In similar fashion, the working Z buffer 44 is initialized by copying background depth data from the background Z buffer 40 to the working Z buffer 44. The background information stored in the background buffers 38 and 40 preferably represents pre-rendered background objects for a fixed view point reference.

Once initialized, the working Z buffer 44 contains depth values corresponding to pixel values in the working frame buffer 42. These depth values have numerical values that define distances between a view point reference and pixels of the frame to be rendered. Consequently, in the initialized state, the working buffers 42 and 44 contain bitmaps identical to those stored in the background buffers 38 and 40.

In step 606, one of the geometric shapes is selected for rendering. For this selected geometric shape, a pixel is selected in step 608 from a set of pixels for the shape. This set of pixels is defined by an intersection between the view point reference and the selected geometric shape.

Referring again to FIGS. 1 and 6, in step 610, an inquiry is conducted to determine whether the selected geometric shape obscures each previously rendered geometric shape at the selected pixel. If so, the "YES" branch is followed from step 610 to step 612. The working buffers 42 and 44 are updated in step 612 with the pixel value and depth value associated with the geometric shape located at the selected pixel. Depth values for the selected geometric shape and each previously rendered geometric shapes for the selected pixel are compared. If the selected geometric shape has a depth value that is less than the depth value for the other geometric shape, then the selected geometric shape obscures this geometric shape at that pixel. In contrast, if the geometric shape fails to obscure another geometric shape at that pixel, the "NO" branch is followed from step 610 to step 614.

For example, as shown in FIGS. 5G and 5H, the portion of the polygon 502 having depth values of numeric value of "5" obscures all portions of the polygon 504 except for those having a depth value of "3" or "4".

Referring still to FIG. 6, in step 614, an inquiry is conducted to determine whether additional pixels exist within the pixel set corresponding to the selected geometric shape. If so, the "YES" branch is followed from step 614 to step 608 and another pixel is selected from this pixel set. However, if the response to this inquiry is negative, the "NO" branch is followed from step 614 to step 616.

In step 616, an inquiry is conducted to determine whether additional geometric shapes remain for the selected frame. If so, the "YES" branch is followed from step 616 to step 606, and another geometric shape is selected. If each geometric shape for this frame has been examined, then the "NO" branch is followed from step 616 to step 618.

In step 618, the contents of the working frame buffer 42 are copied to the pixel-oriented output device, such as the monitor 31, which results in the drawing of the rendered contents of this data structure. In this manner, the proper pixels are illuminated to represent the visible surfaces of the graphical images associated with the scene.

The frame number variable is incremented in response to rendering a frame of the frame sequence. To render another frame of the frame sequence, an inquiry is conducted at step 620 to determine whether a frame of the frame sequence remains unrendered. In other words, a determination is made whether the frame number variable is less than or equal to the number of frames in the frame sequence. If not, the "NO" branch is followed to step 624 and the rendering process terminates at this END step. However, if another frame exists, the "YES" branch is followed to step 622. This may require transferring object-related information from a memory storage device, such as the hard disk drive 20 or the remote memory storage device 33, for introduction to the working buffers 42 and 44. To initiate a cleaning of the previously-rendered contents of the working buffers 42 and 44, a loop is completed from step 622 to step 604 to once again initialize the working buffers. The rendering process 600 begins anew and continues in this manner until each frame is rendered.

The rendering process 600 illustrated in FIG. 6 supports the efficient rendering of a 3-D animation for a sequence of frames. A background can be viewed as a known set of fixed objects for a fixed view point reference. An object that remains fixed or does not change for the duration of the frame sequence also can be treated in a manner similar to pre-rendered background data. Static objects that do not move for the sequence of "n" frames can be rendered once, and other moving objects are rendered "n" times. Specifically, prior to rendering the frame sequence, all static objects are identified. Once rendered, the information associated with the rendering of these static objects can be added to the pre-rendered background information in the background frame and Z buffers 38 and 40. In essence, this requires editing of the pixel values and depth values in the background buffers 38 and 40 to add the rendering information for each static object. In turn, this supports the transfer of both pre-rendered background information and once-rendered information for static objects to the working buffers 42 and 44 during the initialization tasks of step 602. Because the working buffers 42 and 44 are initialized with the contents of the background buffers 38 and 40, the rendering process 600 effectively renders only the objects of new viewing data. This is a more efficient rendering operation than rerendering the entire frame from scratch.

It will be appreciated that rendering is a complex process, typically involving several steps, and takes a significant quantity of time for a conventional personal computer to process. Let "n" be the number of non-moving models, and "m" be the number of moving models. The time to render a single object is "r". Although the time to render an object can vary greatly, depending on the size and complexity of the object, for this example an assumption will be made that rendering time averages out to "r". A simple rendering system would render all "n+m" models at each of the "f" frames. The time to accomplish this would be "r*f*(n+m)", or "r*f*n+r*f*m".

However, in a sequence of frames for which "n" is large and "m" is small, it is advantageous to use rendered static objects, such as a pre-rendered background or a once-rendered static actor. In this manner, static objects are rendered once for the frame sequence. For this example, the total time for rendering would be "1*(r*n)+f*(r*m))" or "r*n+r*f*m". The time savings would be "(r*f*n+r*f*m)−(r*n+r*f*m)=(r*f*n−r*n)=(r*n*(f−1))."

As will be described below in more detail with respect to FIG. 7, it will be appreciated that the initialization of the working frame buffer 42 and the working Z buffer 44 can be optimized by use of a "dirty-region" scheme that removes the effects of a prior rendering from the working buffers. The dirty-region scheme tracks the minimum region required to restore the working buffers 42 and 44 to a "clean" state, and these working buffers are thereafter initialized by copying only the contents corresponding to the dirty region from the background buffers 38 and 40.

Figure 7A:
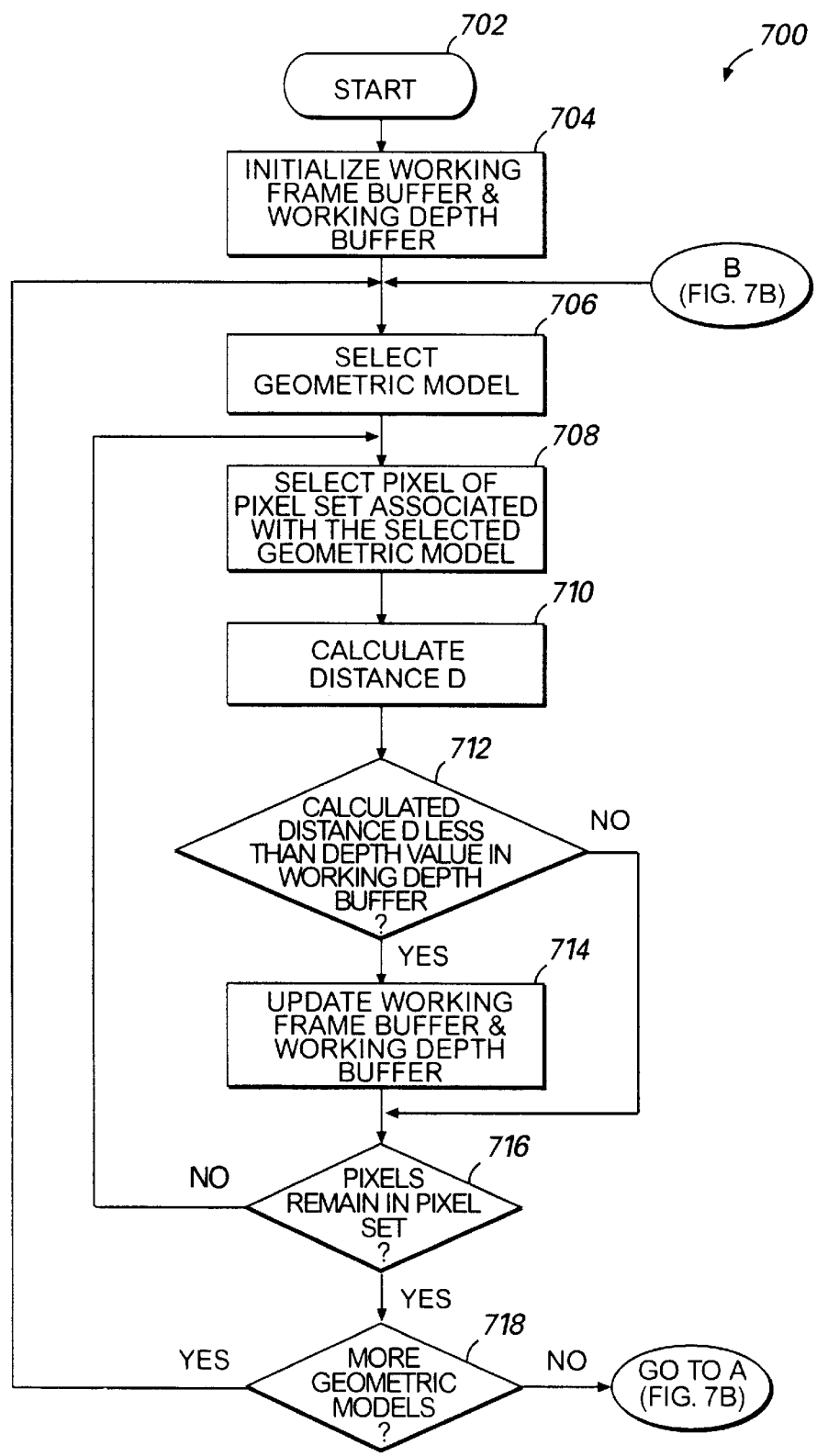
FIGS. 7A and 7B, collectively described as FIG. 7, are logical flow diagrams that illustrate the steps of a computer-implemented rendering process in accordance with the preferred embodiment of the present invention.
Figures 7B, 8:
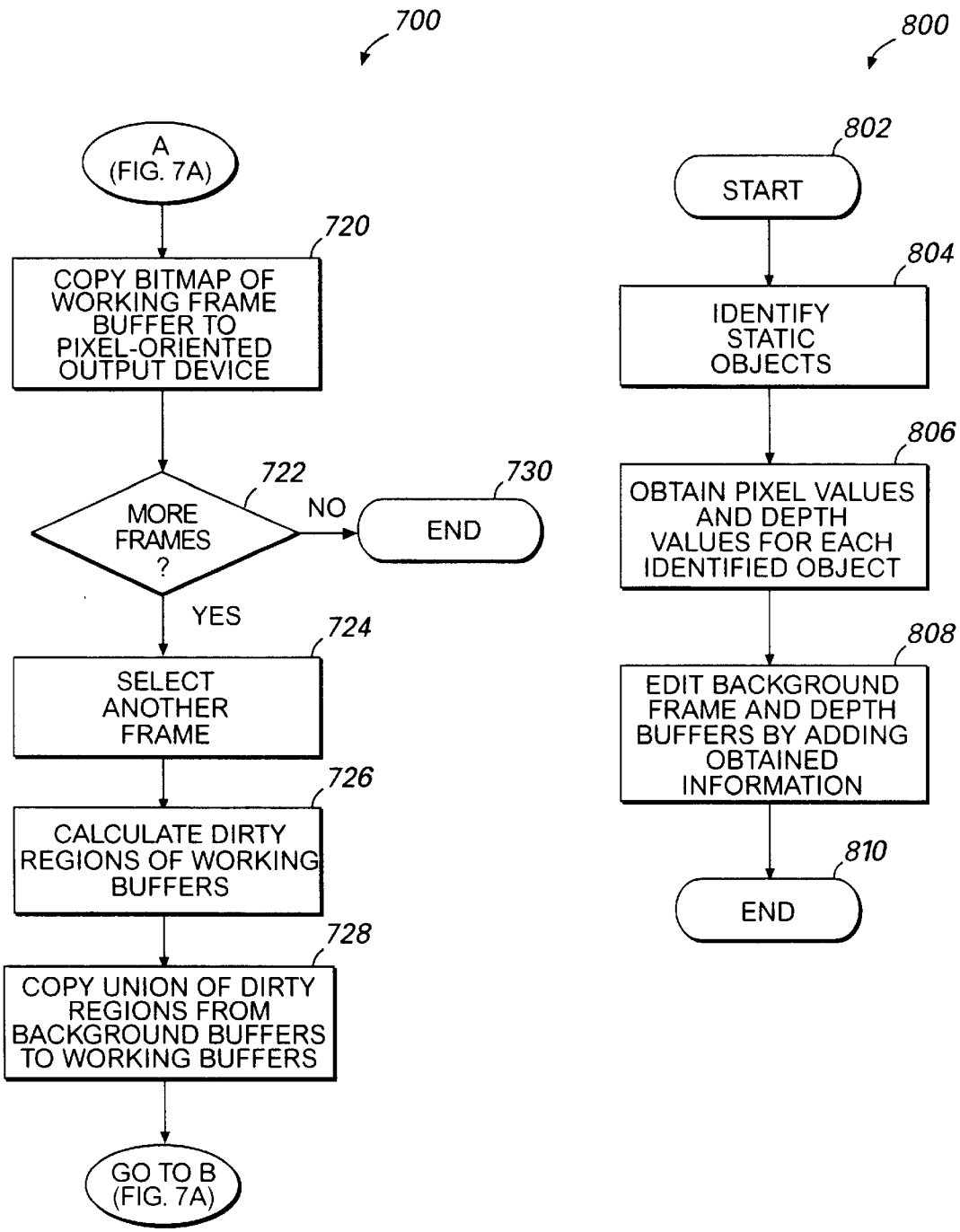
FIG. 8 is a logical flow diagram illustrating the steps of a computer-implemented process for editing background buffers to add once-rendered information for a static object in accordance with the preferred embodiment of the present invention.

FIG. 7, which comprises FIGS. 7A and 7B, is a logical flow diagram providing a detailed view of the preferred steps of a 3D rendering process for supporting the presentation of a sequence of "n" frames on a pixel-oriented output device. Turning now to FIGS. 1 and 7, the rendering process 700 begins at the START step 702 by setting the frame number variable to a selected value and, in turn, selecting a corresponding frame from the sequence of "n" frames. In step 704, pre-rendered background data, which is maintained in the background frame buffer 38, is copied to the working frame buffer 42 to initialize this buffer. Likewise, background depth data, which corresponds to the pre-rendered background data, is copied from the background Z buffer 40 to the working Z buffer 44 to initialize this buffer. In this initialized state, the working buffers 42 and 44 contain background information identical to the background buffers 38 and 40.

In step 706, for this selected frame, a geometric shape, preferably a polygon, such as a triangle, is selected. In turn, a pixel is selected in step 708 from a set of pixels located at the selected geometric shape. This set of pixels is defined by an intersection between the view point reference and the selected geometric shape.

In response to selecting a pixel, a distance D is calculated in step 710. The distance D is defined by the space extending between the view point reference and the selected geometric shape at the selected pixel.

In step 712, an inquiry is conducted to determine whether the calculated distance D is less than the depth value in the working Z buffer 44 for the selected pixel. In particular, this inquiry can be conducted by comparing the calculated distance D to the numerical value for the depth value stored at the pixel in the working Z buffer 44. If the calculated distance D is less than the numerical value for the selected pixel, then the selected geometric shape is closer to the viewer than the previously examined geometric shapes at that selected pixel. Consequently, the selected geometric shape obscures all other geometric shapes rendered as of this stage of the rendering process 700. The "YES" branch is followed from step 712 to step 714 in the event that the calculated distance D is less than the depth value in the working Z buffer for the selected pixel. Otherwise, the "NO" branch is followed from step 712 to step 716.

In step 714, the working frame buffer 42 and the working Z buffer 44 are updated. Specifically, the pixel value for the selected geometric shape at the selected pixel is obtained and stored within the working frame buffer 42. Similarly, the depth value for the selected geometric shape is stored within the working Z buffer 44.

In step 716, an inquiry is conducted to determine whether the pixel set contains pixels that have not yet been examined. If so, the "YES" branch is followed from step 716 to step 708 to complete a loop of the process 700. In contrast, if the response to this inquiry is negative, the "NO" branch is followed to step 718. In step 718, an inquiry is conducted to determine whether the selected frame contains additional geometric shapes that have not yet been examined. If so, the "YES" branch is followed from step 718 to step 706. However, if the response is negative, the "NO" branch is followed to step 720 via node "A".

In step 720, the pixel map maintained within the working frame buffer 42 is copied to the pixel-oriented output device connected to the computer 10. This supports an illumination of the proper pixels on a pixel-oriented output device, such as the monitor 31, thereby presenting the image of the scene for the selected frame to the viewer.

In step 722, the frame number variable is incremented and an inquiry is conducted to determine whether the frame number variable is less than or equal to the total number of frames in the frame sequence. If so, then the "YES" branch is followed to step 724 to initiate a cleaning of the working buffers 42 and 44. Specifically, a dirty region cleaning scheme, also known as a dirty rectangle cleaning technique, is applied to the contents of the working buffers 42 and 44. By determining the regions of the working buffers 42 and 44 representing rendered data, i.e., dirty regions, similar regions in the background buffers 38 and 40 can be copied to these working buffers. This efficiently cleans the contents of the working buffers 42 and 44 by transferring background-related pixel values and depth values from the background buffers 38 and 40 for only the dirty regions.

For the preferred rendering process 700, in step 726, each dirty region is located and preferably enclosed with a rectangle to ensure that all data values within the dirty region are identified. These dirty "rectangles" are then merged to form a union of rectangles comprising an outline working buffer-related data that was updated as a result of the rendering operation. Then, in step 728, contents of the background buffers 38 and 40 corresponding to this union of dirty rectangles is copied into the working buffers 42 and 44. Dirty region identification and cleaning techniques are well known and will not be described further herein.

After cleaning the working buffers 42 and 44 in steps 726 and 728, the process loops back to step 706 via a node In the event that the frame number variable is greater than the total number of frames in the frame sequence, in step 722, the "NO" branch is followed from step 722 to the END step 730. The rendering process terminates at the END step 730.

FIG. 8 is a logical flow diagram illustrating the preferred steps for adding the once-rendered information for a static object to the background buffers to minimize rerendering tasks. Referring now to FIGS. 1 and 8, it will be appreciated that the initialization of the working buffers 42 and 44 on a frame-to-frame basis advantageously provides an opportunity to add once-rendered information to the working buffers during rendering operations. Pre-rendered information is commonly associated with complex backgrounds, whereas once-rendered data is typically associated with static objects, such as an actor, which remains fixed or constant for a frame sequence. By introducing previously rendered information to the working buffers 42 and 44, the preferred rendering system effectively operates to render only those objects that change or move during a frame sequence.

To achieve efficient rendering operations, the background information for the background buffers 38 and 40 can be edited based on once rendered information for static objects. The background buffer editing process 800 begins at the START step 802 and proceeds to step 804 to complete a rendering of identified static objects. The identification of static objects occurs once, at the beginning of rendering operations for the frame sequence. At step 806, the information associated with the prior rendering of each identified static object is obtained from the working buffers 42 and 44. In step 808, this information can be added to the pre-rendered background information of the background frame and Z buffers 38 and 40. In this manner, the pixel values and depth values in the background buffers 38 and 40 are edited to add the rendering information for each static object. This supports the transfer of both pre-rendered background information and once-rendered information for static objects to the working buffers 42 and 44 during the initialization tasks. The process terminates at the END step 810 to support the transfer of the contents of the edited background buffers to the working buffers during the initialization task. This editing process, when coupled with the known dirty region technique for cleaning the working buffers, leads to an optimization of the rendering system.

Figure 9:
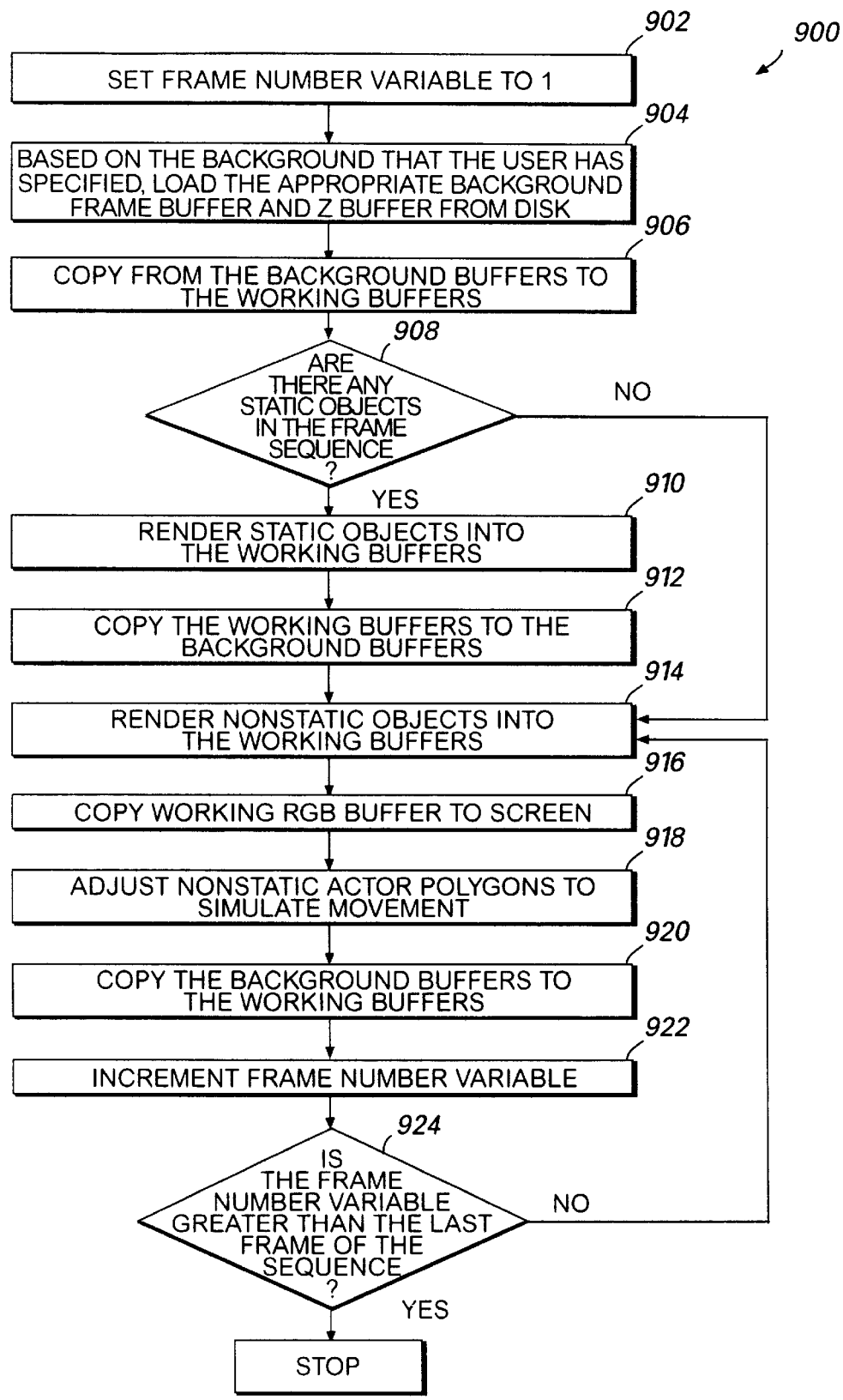
FIG. 9 is a logical flow diagram illustrating the steps of a computer-implemented rendering process for a frame sequence in accordance with the preferred embodiment of the present invention.

FIG. 9 is a logical flow diagram that illustrates the preferred steps for rendering a sequence of frames containing background objects, static objects, and non-static object. Turning now to FIGS. 1 and 9, the preferred rendering process 900 begins by setting a frame number variable to an initial value, preferably one. The frame number variable operates as an index to count each frame of the frame sequence that is rendered by this rendering process. Thus, when the frame number variable exceeds the last frame of the frame sequence, the rendering process is completed for this frame sequence. After setting the frame number variable to an initial value, background information is loaded in step 904 to the background buffers 38 and 40 from a mass storage medium, such as a CD-ROM. This background information is typically loaded into the background buffers 38 and 40 in response to a user selection of background information. In turn, the contents of the background buffers 38 and 40 are copied in step 906 to the working buffers 42 and 44. In this manner, the working buffers 42 and 44 are initialized with initial pixel and depth values.

In step 908, an inquiry is conducted to determine whether static objects are available in the frame sequence. Specifically, this inquiry examines whether an object remains fixed or otherwise constant during the frame sequence. If so, the "YES" branch is followed to step 910 and the identified static objects are rendered into the working buffers 42 and 44. In step 912, the contents of the working buffers 42 and 44 are copied to the background buffers 38 and 40. The process then continues to step 914. Likewise, if the inquiry in step 908 results in a negative response, the "NO" branch is followed to the step 914.

In step 914, the non-static objects of the selected frame are rendered into the working buffers 42 and 44. The resulting pixel values in the working frame buffer 42 are then copied to the pixel-oriented output device for presentation to the user in step 916.

In step 918, the geometric shapes, typically polygons, associated with each non-static object are adjusted as required to simulate movement. The contents of the background buffers 38 and 40 are then copied to the working buffers 42 and 44 in step 920. In step 922, the frame number variable is incremented to move to the next frame, if available, of the frame sequence. In step 924, an inquiry is conducted to determine whether the frame number variable is greater than the last frame of the sequence. If so, the "YES" branch is followed to the "END" step and the process is terminated. However, if the response to the inquiry in step 924, is negative, the "NO" branch is followed to step 914. Thus, the loop of steps 914–924 is completed for each frame of the frame sequence. Significantly, the static-objects are rendered into the working buffers 42 and 44 only once, thereby minimizing re-rendering operations. Likewise, the background objects are rendered into the working buffers 42 and 44 only once, thereby achieving efficiencies in the rendering operations.

In summary, the present invention provides a system for efficiently rendering a sequence of frames by minimizing the rerendering of static objects. For a selected frame, a working frame buffer is initialized by copying background data maintained in a background frame buffer to the working frame buffer. A working Z buffer is initialized by copying background depth data of the background Z buffer to the working Z buffer. The background data is typically represented by a pre-rendered bitmap defining values for pixels of the background remaining constant for a fixed view point reference during the frame sequence. The background depth data, which corresponds to the pre-rendered background data, is represented by depth values defining distances between a view point reference and geometric shapes at the background pixels.

During subsequent scan conversion operations, working data for the selected frame, which represents information to be added during the frame, is supplied to the working frame and Z buffers. For a selected geometric shape, a pixel is selected from a set of pixels for the frame. This set of pixels is defined by an intersection between the view point reference and the selected geometric shape. A determination is then made whether the selected geometric shape obscures a previously rendered geometric shape at the selected pixel. If so, a value of the selected pixel is obtained and stored within the working frame buffer. In addition, a depth value defined by a distance between the view point reference and the selected geometric shape at the selected pixel is stored within the working Z buffer. These steps are completed for each remaining pixel within the set of pixels and, in turn, this process is completed for each remaining geometric shape. Upon rendering each of the geometric shapes of the new viewing data, the updated bitmap stored in the working frame buffer can be copied to the pixel-oriented output device for presentation to the viewer.

If other frames remain in the frame sequence, then each remaining frame can be selected for rendering by this system. To optimize the rendering process for a set of multiple frames, a dirty region technique can be used to define the previously rendered areas of these working buffers. In turn, regions of the background buffers corresponding to these dirty regions can be copied into the working buffers, thereby completing an efficient initialization operation.

From the foregoing, it will be appreciated that the present invention indeed fulfills the needs of the prior art described herein above and meets the above-stated objects and advantages. While there has been shown and described the preferred embodiment of the invention, it will be evident to those skilled in the art that various modifications and changes may be made thereto without departing from the spirit and the scope of the invention as set forth in the appended claims and equivalence thereof.

What is claimed is:

1. A method for determining each visible surface of a scene comprising a sequence of frames, each having a plurality of geometric shapes and corresponding to a plurality of pixels, the scene having a background remaining constant for the frame sequence, to support a presentation on a pixel-oriented output device of an image of the scene, comprising the steps of:

(a) initializing a frame number variable, each frame associated with a frame number;

(b) initializing a working frame buffer by copying background data of a background frame buffer to the working frame buffer, the background data defined by values for pixels corresponding to the background, and initializing a working Z buffer by copying background depth data of a background Z buffer to the working Z buffer, the background depth data represented by depth values defining spatial relationships between a view point reference and geometric shapes at the pixels of the background;

(c) responsive to initializing the working frame buffer and the working Z buffer, for a selected frame corresponding to the frame number variable, rendering the geometric shapes into the working frame buffer and the working Z buffer;

(d) incrementing the frame number variable; and (e) repeating steps (b)–(d) until the frame number variable is greater than the number of frames within the frame sequence.

2. The method of claim 1, wherein the rendering step comprises the steps of:

for a selected one of the geometric shapes, selecting one of the pixels within a set of the pixels of the scene intersected between the selected geometric shape and the view point reference;

determining whether the selected geometric shape obscures another one of the geometric shapes at the selected pixel,
if so, obtaining a value of the selected pixel and storing the selected pixel value within the working frame buffer, and storing within the working Z buffer a depth value defining a spatial relationship between the selected geometric shape at the selected pixel and the view point reference;

repeating the determining step for each remaining pixel within the set of pixels; and repeating the above steps for each remaining geometric shape.

3. The process of claim 2, wherein the step of determining whether the selected geometric shape obscures another one of the geometric shapes comprises the steps of:

calculating the distance between the view point reference and the selected geometric shape at the selected pixel; and determining whether the calculated distance is greater than one of the depth values in the working Z buffer at the selected pixel, if so, then the selected geometric shape obscures the geometric shape at the selected pixel within the set of pixels.

4. The process of claim 3 further comprising the step of:

responsive to rendering the geometric shapes associated with the selected frame, presenting the scene image for the selected frame on the pixel-oriented output device by copying a bitmap of the updated working frame buffer to the pixel-oriented output device.

5. The process of claim 1, wherein the steps of initializing the working frame buffer and the working Z buffer comprise:

determining regions of the working frame buffer and the working Z buffer that are dirty in response to rendering a prior one of the frames;

defining an overall dirty region representing a union of the dirty regions for the working frame buffer and the working Z buffer; and copying pixel values corresponding to the overall dirty region from the background frame buffer to the working frame buffer and depth values corresponding to the overall dirty region from the background Z buffer to the working Z buffer.

6. The process of claim 1, wherein each depth value of the background depth data comprises a numerical value representing a distance between the view point reference and the background at one of the background pixels.

7. A method for determining each visible surface of a scene comprising a sequence of frames, each having a plurality of geometric shapes and corresponding to a plurality of pixels, the scene having a pre-rendered background of geometric shapes remaining constant for the frame sequence, to support a presentation on a pixel-oriented output device of an image of the scene, comprising the steps of:

(a) for a selected one of the frames, initializing a working frame buffer by copying background data of a background frame buffer to the working frame buffer, the background data defined by values for pixels corresponding to the background, and initializing a working Z buffer by copying background depth data of a background Z buffer to the working Z buffer, the background depth data represented by depth values defining spatial relationships between a view point reference and geometric shapes at the pixels of the background;

(b) responsive to initializing the working frame buffer and the working Z buffer, rendering the selected frame by:
  (i) for a selected one of the geometric shapes, selecting one of the pixels within a set of the pixels of the scene intersected between the selected geometric shape and the view point reference;
  (ii) determining whether the selected geometric shape obscures another one of the geometric shapes at the selected pixel,
    if so, obtaining a value of the selected pixel and storing the selected pixel value within the working frame buffer, and storing within the working Z buffer a depth value defining a spatial relationship between the selected geometric shape at the selected pixel and the view point reference;
  (iii) repeating step (ii) for each remaining pixel within the set of pixels; and
  (iv) repeating steps (i)–(iii) for each remaining geometric shape.

8. The process of claim 7, wherein each depth value of the background depth data comprises a numerical value representing a distance between the view point reference and one of the geometric shapes of the background at one of the background pixels.

9. The process of claim 7, wherein the step of determining whether the selected geometric shape obscures another one of the geometric shapes comprises the steps of:

calculating the distance between the view point reference and the selected geometric shape at the selected pixel; and determining whether the calculated distance is greater than one of the depth values in the working Z buffer at the selected pixel,
  if so, then the selected geometric shape obscures the geometric shape at the selected pixel within the set of pixels.

10. The process of claim 7 further comprising the step of:

(c) presenting the scene image for the selected frame on the pixel-oriented output device by copying a bitmap of the updated working frame buffer to the pixel-oriented output device.

11. The process of claim 10 further comprising the steps of:

in response to presenting the scene image of the selected frame on the pixel-oriented output device, repeating steps (a)–(b) for another one of the frames.

12. The process of claim 11, wherein the steps of initializing the working frame buffer and the working Z buffer comprise:

determining regions of the working frame buffer and the working Z buffer that are dirty in response to rendering a prior one of the frames;

defining an overall dirty region representing a union of the dirty regions for the working frame buffer and the working Z buffer; and copying pixel values corresponding to the overall dirty region from the background frame buffer to the working frame buffer and depth values corresponding to the overall dirty region from the background Z buffer to the working Z buffer.

13. The process of claim 7, wherein the scene further comprises static objects of geometric shapes that remain static during the frame sequence and non-static objects of geometric shapes that change during the frame sequence, and the rendering step comprises:

identifying the static objects in the frame sequence;

rendering the identified static objects into the working frame buffer and the working Z buffer by conducting steps (b)(i)–(iv) for each geometric shape of the static objects;

responsive to rendering the identified static objects, copying the working frame buffer into the background frame buffer, and copying the working Z buffer into the background Z buffer; and for each frame, rendering the non-static objects into the working frame buffer and the working Z buffer by conducting steps (b)(i)–(iv) for each geometric shape of the non-static objects.

14. The process of claim 13, wherein the step of rendering the nonstatic objects comprises:

for each frame of the frame sequence,
  rendering the non-static objects into the working frame buffer and the working Z buffer;
  copying the working frame buffer to a pixel-oriented output device for presentation of an image of the scene; and
  copying the background frame buffer into the working frame buffer, and copying the background Z buffer into the working Z buffer.

15. A computer—implemented method for rendering a scene comprising a sequence of frames, each having a plurality of geometric shapes and corresponding to a plurality of pixels, the scene having a background of geometric shapes remaining constant for the frame sequence, to support a presentation of an image of the scene, comprising the steps:

(a) initialize a frame number variable, each frame associated with a frame number;

(b) for a selected one of the frame corresponding to the frame number variable, initialize a working frame buffer by copying background data of a background frame buffer to the working frame buffer, the background data defined by a bitmap having values for pixels of the background, the working frame buffer operative to store a bitmap defining values for pixels of the selected frame;

(c) initialize a working Z buffer by copying background depth data of a background Z buffer to the working Z buffer, the background depth data represented by depth values defining distances between a fixed view point reference and geometric shapes at the pixels of the background, the working Z buffer operative to store depth values defining distances between the view point reference and geometric shapes at the pixels of the selected frame;

(d) responsive to initializing the working frame buffer and the working Z buffer, render the selected frame by:
  (i) for a selected one of the geometric shapes of the scene, selecting one of the pixels within a set of pixels intersected between the selected geometric shape and the view point reference;
  (ii) determining whether the selected geometric shape obscures another one of the geometric shapes at the selected pixel within the set of pixels,
    if so, obtaining a value of the selected pixel and storing the selected pixel value within the bitmap of the working frame buffer, and storing within the working Z buffer a depth value defined by a distance between the view point reference and the selected geometric shape at the selected pixel;
  (iii) repeating steps (ii) for each remaining pixel of the set of pixels;
  (iv) repeating steps (i)–(iii) for each remaining geometric shape;
(e) present an image for the selected frame by copying a bitmap of the updated working frame buffer to a pixel-oriented output device;
(f) increment the frame number variable; and
(g) repeat steps (a)–(f) for each remaining frame.

16. The computer—implemented method of claim 15, wherein the step of initializing the working frame buffer and the working Z buffer comprises the steps:
  determining regions of the working frame buffer and the working Z buffer that are dirty in response to rendering a prior one of the frames;
  defining an overall dirty region representing a union of the dirty regions for the working frame buffer and the working Z buffer; and
  copying pixel values corresponding to the overall dirty region from the background frame buffer to the working frame buffer and depth values corresponding to the overall dirty region from the background Z buffer to the working Z buffer.

17. The computer-implemented method of claim 15, wherein the step of determining whether the selected geometric shape obscures one of the geometric shapes comprises the steps:
  calculating the distance between the view point reference and the selected geometric shape at the selected pixel; and
  determining whether the calculated distance is greater than one of the depth values in the working Z buffer at the selected pixel,
    if so, then the selected geometric shape obscures the geometric shape at the selected pixel within the set of pixels.

18. The computer-implemented method of claim 15, wherein the step of rendering the selected frame comprises the steps:
  (A) for the selected frame of the frame sequence, identifying each geometric shape of the scene, other than the background, which remains static during the frame sequence;
  (B) for a selected one of the identified geometric shapes, selecting one of the pixels within a set of the pixels of the scene intersected between the selected identified geometric shape and the view point reference,
  (C) determining whether the selected identified geometric shape obscures another geometric shape at the selected pixel,
    if so, obtaining a value of the identified selected pixel and storing the selected pixel value within the working frame buffer, and storing within the working Z buffer a depth value defining a spatial relationship between the selected geometric shape at the selected pixel and the view point reference;
  (D) repeating step (C) for each remaining pixel of the set of pixels;
  (E) repeating steps (C)–(D) for each remaining geometric shape;
  (F) copying the working frame buffer and the working Z buffer to the background Z buffer and the background Z buffer; and
  (G) for a selected one of the geometric shapes of the scene, other than the geometric shapes of the background and the static geometric shapes, selecting one of the pixels within a set of the pixels of the scene intersected between the selected geometric shape and the view point reference,
  (H) determining whether the selected geometric shape obscures another geometric shape at the selected pixel,
    if so, obtaining a value of the selected pixel and storing the selected pixel value within the working frame buffer, and storing within the working Z buffer a depth value defining a spatial relationship between the selected geometric shape at the selected pixel and the view point reference;
  (I) repeating step (H) for each remaining pixel of the set of pixels; and
  (J) repeating steps (H)–(I) for each remaining geometric shape.

19. The computer-implemented method of claim 18 further comprising the steps of:
  in response to completing step (j), copying the working frame buffer to a pixel-oriented output device; and
  copying the background frame buffer into the working frame buffer, and copying the background Z buffer into the working Z buffer.

20. For a computer characterized by a pixel-oriented output device and a memory containing a background frame buffer, working frame buffer, a background Z buffer, and a working Z buffer, a computer-implemented method for rendering a scene comprising a sequence of frames, each having a plurality of polygons and corresponding to a plurality of pixels, the scene having a background of polygons remaining constant for the frame sequence, to support a presentation of an image of the scene on a pixel-oriented output device, comprising the steps of:
  initializing the working frame buffer and the working Z buffer by:
  (a) for a selected one of the frames, copying background data maintained in the background frame buffer to the working frame buffer, the background data represented by a bitmap defining values for pixels of the background, the working frame buffer operative to store a bitmap defining values for pixels of the frame to be rendered;
  (b) for the selected frame, copying background depth data of the background Z buffer to the working Z buffer, the background depth data represented by numerical values defining distances between a view point reference and polygons at the background pixels, the working Z buffer operative to store numerical values defining distances between the view point reference and polygons at the pixels of the frame to be rendered, the view point reference defining a fixed point located in front of the background;

(c) responsive to initializing the working frame buffer and the working Z buffer. rendering the selected frame by:
  (i) for a selected one of the polygons, determine a set of the pixels intersected between the selected polygon and the view point reference;
  (ii) for a pixel selected from the set of pixels, calculating a distance between the view point reference and the selected polygon at the selected pixel;
  (iii) comparing the calculated distance to the numerical value for the polygon at the selected pixel in the working Z buffer;
    if the calculated distance is greater than the numerical value for the selected pixel, then repeat step (ii) for one of the remaining pixels of the set of pixels; otherwise, obtain a value of the selected pixel and store the selected pixel value within the working frame buffer, and store the calculated distance within the working Z buffer;
  (iv) repeating steps (ii)–(iii) for each remaining pixel within the set of pixels;
  (v) repeating steps (i)–(iv) for each remaining polygon;
(d) presenting the image for the selected frame on the pixel-oriented output device by copying a bitmap of the working frame buffer to the pixel-oriented output device;
(e) selecting a remaining one of the frames in response to presenting the image of the selected frame on the pixel-oriented output device, and repeating steps (a)–(d) for each remaining selected frame.

21. The computer-implemented method of claim 20, wherein the view point reference is located in front of the background and remains fixed for the frame sequence.

22. The computer-implemented method of claim 20, wherein the steps of initializing the working frame buffer and the working Z buffer comprise:
  determining regions of the working frame buffer and the working Z buffer that are dirty in response to rendering a prior one of the frames;
  defining an overall dirty region representing a union of the dirty regions for the working frame buffer and the working Z buffer; and
  copying pixel values corresponding to the overall dirty region from the background frame buffer to the working frame buffer and depth values corresponding to the overall dirty region from the background Z buffer to the working Z buffer.

23. A computer-readable medium on which is stored a program module for rendering a scene comprising a sequence of frames, each having a plurality of geometric shapes and corresponding to a plurality of pixels, the scene having a background of geometric shapes remaining constant for the frame sequence, the program module comprising computer-executable instructions for performing the steps of:
  (a) for a selected one of the frames, initialize the working frame buffer by copying background data maintained in a background frame buffer to the working frame buffer, the background data represented by a bitmap defining values for pixels of a background that remains constant for the frame sequence, the working frame buffer operative to store a bitmap defining values for pixels of the frame to be rendered;
  (b) initialize a working Z buffer by copying background depth data of the background Z buffer to the working Z buffer, the background depth data represented by depth values defining distances between a fixed view point reference and geometric shapes at the background pixels, the working Z buffer operative to store depth values defining distances between the view point reference and geometric shapes at the pixels of the frame to be rendered;
  (c) for each frame of the frame sequence, identifying each geometric shape of the scene, other than the background, which remains static during the frame sequence;
  (d) for a selected one of the identified geometric shapes, selecting one of the pixels within a set of the pixels of the scene intersected between the selected identified geometric shape and the view point reference,
  (e) determining whether the selected identified geometric shape obscures another geometric shape at the selected pixel,
    if so, obtaining a value of the identified selected pixel and storing the selected pixel value within the working frame buffer, and storing within the working Z buffer a depth value defining a spatial relationship between the selected geometric shape at the selected pixel and the view point reference;
  (f) repeating step (e) for each remaining pixel of the set of pixels;
  (g) repeating steps (d)–(f) for each remaining geometric shape;
  (h) copying the working frame buffer and the working Z buffer to the background frame buffer and the background Z buffer; and
  (i) for a selected one of the geometric shapes of the scene, other than the geometric shapes of the background and the static geometric shapes, selecting one of the pixels within a set of the pixels of the scene intersected between the selected geometric shape and the view point reference,
  (j) determining whether the selected geometric shape obscures another geometric shape at the selected pixel,
    if so, obtaining a value of the selected pixel and storing the selected pixel value within the working frame buffer, and storing within the working Z buffer a depth value defining a spatial relationship between the selected geometric shape at the selected pixel and the view point reference;
  (k) repeating step (j) for each remaining pixel of the set of pixels;
  (l) repeating steps (j)–(k) for each remaining geometric shape;
  (m) presenting an image for the selected frame on the pixel-oriented output device by copying a bitmap of the updated working frame buffer to the pixel-oriented output device;
  (n) responsive to presenting the image, copying the background frame buffer to the working frame buffer and copying the background Z buffer to the working Z buffer; and
  (o) repeating steps (i)–(n) for each one of the remaining frames.

24. The computer-readable medium of claim 23, wherein the computer-executable instructions for initializing the working frame buffer and the working Z buffer comprise the steps:

determining regions of the working frame buffer and the working Z buffer that are dirty in response to rendering a prior one of the frames;

defining an overall dirty region representing a union of the dirty regions for the working frame buffer and the working Z buffer; and copying pixel values corresponding to the overall dirty region from the background frame buffer to the working frame buffer and depth values corresponding to the overall dirty region from the background Z buffer to the working Z buffer.

25. A computer-readable medium on which is stored a program module for rendering a scene comprising a sequence of frames having background objects, at least one static object, and at least one non-static object, the background objects remaining constant for the frame sequence during a fixed view point reference, each static object remaining constant during the frame sequence, each non-static object changing during the frame sequence, the program module comprising computer-executable instructions for performing the steps of:

loading the background objects into the background frame buffer and the background Z buffer, the background objects defined by pre-rendered background data rendered prior to execution of the program module on the computer;

copying the background frame buffer into the working frame buffer, and copying the background Z buffer into the working Z buffer;

identifying the static objects in the frame sequence;

rendering the identified static objects into the working frame buffer and the working Z buffer;

responsive to rendering the static objects, copying the working frame buffer into the background frame buffer, and copying the working Z buffer into the background Z buffer;

for a selected one of the frames, rendering the non-static objects into the working frame buffer and the working Z buffer; and copying the working frame buffer to a pixel-oriented output device, coupled to the computer, for presentation of an image of the scene for the selected frame.

26. The computer-readable medium of claim 25, wherein the program module further comprises computer-executable instructions for performing the steps of:

in response to copying the working frame buffer to the pixel-oriented output device, copying the background frame buffer into the working frame buffer, and copying the background Z buffer into the working Z buffer;

for each one of the remaining frames of the frame sequence, rendering the non-static objects into the working frame buffer and the working Z buffer;

responsive to rendering the non-static objects copying the working frame buffer to a pixel-oriented output device for presentation of an image of the scene for the remaining frame; and copying the background frame buffer into the working frame buffer, and copying the background Z buffer into the working Z buffer.

27. The computer-readable medium of claim 25, wherein the computer-executable instructions for copying the background frame buffer to the working frame buffer and copying the background Z buffer to the working Z buffer comprise the steps of:

determining regions of the working frame buffer and the working Z buffer that are dirty in response to rendering a prior one of the frames;

defining an overall dirty region representing a union of the dirty regions for the working frame buffer and the working Z buffer; and copying pixel values corresponding to the overall dirty region from the background frame buffer to the working frame buffer and depth values corresponding to the overall dirty region from the background Z buffer to the working Z buffer.

* * * * *